(12) United States Patent
Hasegawa et al.

(10) Patent No.: US 7,559,835 B2
(45) Date of Patent: Jul. 14, 2009

(54) VIDEO GAME PROCESSING APPARATUS, A METHOD AND A COMPUTER PROGRAM PRODUCT FOR PROCESSING A VIDEO GAME

(75) Inventors: Tomohiro Hasegawa, Tokyo (JP); Tatsuya Kando, Tokyo (JP); Takeshi Arakawa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 179 days.

(21) Appl. No.: 11/846,924

(22) Filed: Aug. 29, 2007

(65) Prior Publication Data
US 2008/0102949 A1 May 1, 2008

(30) Foreign Application Priority Data
Nov. 1, 2006 (JP) .............................. 2006-298245

(51) Int. Cl.
*A63F 9/24* (2006.01)
(52) U.S. Cl. ............................................. 463/7; 463/37
(58) Field of Classification Search ..................... 463/7, 463/37, 42
See application file for complete search history.

(56) References Cited

U.S. PATENT DOCUMENTS

| | | | | |
|---|---|---|---|---|
| 6,149,523 | A * | 11/2000 | Yamada et al. | .................. 463/31 |
| 6,227,968 | B1 | 5/2001 | Suzuki et al. | |
| 6,379,244 | B1 | 4/2002 | Sagawa et al. | |
| 6,410,835 | B2 | 6/2002 | Suzuki et al. | |
| 6,450,888 | B1 * | 9/2002 | Takase et al. | .................. 463/43 |
| 6,461,239 | B1 | 10/2002 | Sagawa et al. | |
| 7,128,649 | B2 * | 10/2006 | Nobe et al. | .................... 463/23 |
| 2001/0004861 | A1 * | 6/2001 | Suzuki et al. | .................. 84/609 |

(Continued)

FOREIGN PATENT DOCUMENTS

JP 2922509 4/1999

(Continued)

OTHER PUBLICATIONS

"Weekly Fami-Tsu, Oct. 8, 2004 (Before Crisis Final Fantasy. VII)" (Enterbrain, Inc., Oct. 8, 2004, vol. 19, No. 41, pp. 208-209), accompanied by an English language partial translation of the same.

(Continued)

*Primary Examiner*—Dmitry Suhol
*Assistant Examiner*—Masud Ahmed
(74) *Attorney, Agent, or Firm*—Greenblum & Bernstein, P.L.C.

(57) ABSTRACT

An image display apparatus is caused to respectively display operation guidance constituted from operation instruction icons and end display icons each presenting a specific image and card type icons having display images indicating specific images in first and second specific regions of an image display screen under a predetermined condition. In the case where the operation instruction icons are selected and one end display icon is thereby reached when the card type icon corresponding to the specific image presented by the one end display icon is displayed in the second specific region, the display image of the card type icon is displayed so as to become an exposed state at least temporarily. A privilege relating to a special effect is applied to the player character in the case where all of the display images of the card type icons keep the exposed states for a predetermined period of time.

11 Claims, 9 Drawing Sheets

U.S. PATENT DOCUMENTS

2001/0016510 A1* 8/2001 Ishikawa et al. .............. 463/7

FOREIGN PATENT DOCUMENTS

| JP | 11-300044 | 11/1999 |
| JP | 3003851 | 11/1999 |
| JP | 2000-279633 | 10/2000 |
| JP | 2002-024833 | 1/2002 |
| JP | 2003-296284 | 10/2003 |
| JP | 2004-078890 | 3/2004 |
| JP | 2004-290306 | 10/2004 |
| JP | 2005-296419 | 10/2005 |
| JP | 2006-087625 | 4/2006 |

OTHER PUBLICATIONS

"LOGiN, vol. 25, No. 9 (Final Fantasy XI)" (Enterbrain, Inc., Sep. 1, 2006, vol. 25, No. 9, pp. 138-139), accompanied by an English language partial translation of the same.
English language Abstract of JP 2005-296419.
English language Abstract of JP 2004-078890.
English language Abstract of JP 2003-296284.
English language Abstract of JP 11-300044.
English language Abstract of JP 2000-279633.
English language Abstract of JP 2006-087625.
English language Abstract of JP 2004-290306.
"Subarashikikonosekai," [online], Sep. 22, 2006, Square Enix Co., Ltd., (searched on Feb. 5, 2008) Internet <URL:http://www.square.enix.co.jp/gs06/titles/subarashiki/>.
"Fighting for One Piece," V Jump Books [Game Series] For PlayStation 2, Shueisha Inc., Japan, Sep. 13, 2005, First Edition, p. 24.
"Mariokart DS: Kanpeki Bakuso Guide Book," Enterbrain Inc., Japan, Jan. 24, 2006, First Edition, p. 25, accompanied by an English language partial translation thereof.
"Gallop Racer 6—Revolution—Saisyu Koryaku Text ~ Tetsuwan Jockey Yousei Guide ~," DigiCube Co., Ltd., Japan, Feb. 3, 2003, First Edition, p. 54, accompanied by an English language partial translation thereof.
"Romancing SaGa—Minstrel Song—," V Jump Books [Game Series] For PlayStation 2, Shueisha Inc., Japan, Apr. 26, 2005, First Edition, p. 29, accompanied by an English language partial translation thereof.
"Tengai Makyo III Namida Official Guide Book," Enterbrain Inc., Japan, Apr. 26, 2005, First Edition, p. 21, accompanied by an English language partial translation thereof.
"PlayStation Bust a Move 2 Dance Tengoku Mix," Shueisha Inc., Japan, May 5, 1999, First Edition, p. 43, accompanied by an English language partial translation thereof.
English language Abstract of JP 11-151380.
English language Abstract of JP 2000-037490.
English language Abstract of JP 2002-024833.
U.S. Appl. No. 11/846,755 to Kando et al., which was filed Aug. 29, 2007.

* cited by examiner

VIDEO GAME PROCESSING APPARATUS, A METHOD AND A COMPUTER PROGRAM PRODUCT FOR PROCESSING A VIDEO GAME

CROSS-REFERENCE TO RELATED APPLICATION

The present disclosure relates to subject matter contained in Japanese Patent Application No. 2006-298245, filed on Nov. 1, 2006, the disclosure of which is expressly incorporated herein by reference in its entirety.

BACKGROUND OF THE INVENTION

1. Field of the Invention

The present invention relates to a technique for controlling progress of a video game by displaying a player character on an image display screen of an image display apparatus, and by controlling an action of the player character displayed on the image display screen in response to operation(s) by a player.

2. Description of the Related Art

Heretofore, various kinds of so-called role playing games (RPG; that is, a game in which a player plays a role of a character in a world of the game to accomplish a predetermined object while enjoying a process that the character grows through various experiences) have been provided.

In such a RPG, generally, a player character acting in response to operations by the player wins a battle against an enemy character thwarting accomplishment of a predetermined object in the RPG, by which various benefits such as an experiential value are supplied to the player character.

In a video game such as a RPG, an attack against an enemy character in a battle is generally executed by means of a direct attack in which a weapon such as a sword or part of magic is used or an indirect attack in which an object item that has no relation to the player character and/or an enemy character is used. There are some attacks devised so that the player character can attack an enemy character to apply a great deal of damage to the enemy character using a so-called special technique (or special weapon) that is to be activated by satisfying a specific condition.

For example, a condition to specify a command so as to use a specific item or magic, a condition to input a special command at specific timing, and a condition that attacks against an enemy character continuously succeed predetermined times have been well known as the specific condition to activate such a special technique.

Further, in other categories of video games than a RPG, there are a lot of video games that adopt conditions relating to the video games as described above other than the conditions to obtain a specific effect such as an attack using a special technique. Among them, as a video game in which a player can obtain a higher score or a special effect depending upon how to execute a specific action timely, there is a video game as follows, for example.

Namely, there has been proposed a video game in which a player executes, using an input device such as a simulated musical instrument or the like, operational inputs in accordance with instructions of contents, for example, which a cursor proceeding at specific speed indicates along operation guidance such as an icon displayed on a display screen of an image display apparatus (for example, see Japanese Patent No. 2,922,509).

Further, there has also been proposed a video game that adopts an input device using parts of the body of the player or behavior of the player itself, in order to execute operational inputs in accordance with instructions of contents, for example, indicated by a cursor displayed against operation guidance such as an icon displayed on a display screen of an image display apparatus (for example, see Japanese Patent No. 3,003,851 and Japanese Patent Application Publication No. 2002-24833).

However, in a system of operational inputs relating to progress of a video game in such a conventional video game, even though the operational inputs are executed in accordance with instructions by the operation guidance and/or the cursor, this merely results in simple addition of a score. Thus, there has been a fear to lose player's will to continue to play the video game. Further, in the case where a special command is inputted to obtain a special effect such as an attack with a special technique (or special weapon), operational skill of the player influences progress of the video game. Thus, there has been a fear to lose interest of some players in the video game.

SUMMARY OF THE INVENTION

It is one object of the present invention to solve the problems described above and to provide a video game processing apparatus, a method and a computer program product for processing a video game capable of improving the taste relating to operations of a player by using various elements such as thought of the player and a condition of luck in addition to operational skill of the player when to create a direction (or stage) by a special effect in the video game, by which interest of many players in the video game can be improved regardless of the operational skill of a player.

In order to achieve the above object, an aspect of the present invention is directed to a video game processing apparatus that causes an image display apparatus to display a player character on an image display screen of the image display apparatus. The video game processing apparatus (for example, a video game apparatus main body 10, a video game apparatus 100) controls progress of a video game by controlling an action of the player character to be displayed on the image display screen in accordance with operations by a player. The video game processing apparatus of the present invention includes an action specification receiver that receives action specification of the player character in response to an action specification operation by the player.

The video game processing apparatus also includes an operation guidance display controller that causes the image display apparatus to display an operation guidance in a first specific region of the image display screen in the case where the action specification receiver receives specific action specification, the operation guidance being constituted from a plurality of operation instruction icons and a plurality of end display icons, the plurality of operation instruction icons being continuously arranged via one or more branching point in a state that the plurality of operation instruction icons can in turn be selected so as to cause the player to regularly and sequentially continue to carry out operational inputs with an input section, the plurality of end display icons respectively presenting specific images that indicate selected end positions to which the plurality of operation instruction icons lead.

The video game processing apparatus also includes a card-type icon display controller that causes the image display apparatus to display a plurality of card type icons each having a display image in a second specific region of the image display screen, the display images respectively indicating the specific images presented by the plurality of end display icons, wherein, in the case where it is determined that the player carries out the operational inputs regularly and sequentially so as to select the plurality of operation instruction icons in accordance with the operation guidance displayed on the image display screen by means of the operation guidance display controller and one of the plurality of end display icons is thereby reached when the card type icon having the display image that indicates the specific image presented by the one end display icon is displayed in the second specific region, the card-type icon display controller causes the image display apparatus to display the display image of the card type icon so as to become an exposed state at least temporarily.

The video game processing apparatus also includes a privilege applier that applies a privilege relating to a special effect to the player character in the case where all of the display images of the plurality of card type icons displayed in the second specific region by means of the card-type icon display controller keep the exposed states for a predetermined period of time.

Since the video game processing apparatus may have a configuration as described above, it is possible to improve taste or interest of the player relating to operations by using various other elements such as thought of the player and a condition of luck in addition to the operational skill of the player when to create a rendition (or direction) by a special effect (for example, activation of a special technique in a battle and the like) in the video game. This allows interest of many players in the video game to be improved regardless of the operational skill of the player.

It is preferable that the operation guidance display controller causes the image display apparatus to display a cursor so as to be included in the operation guidance, the cursor being displayed so as to be capable of moving along the plurality of operation instruction icons and to point the operation instruction icon to be selected by means of the operational inputs from the player. Since the video game processing apparatus may have a configuration as described above, it is possible to present operation instructions to the player more clearly, and this makes it possible to improve the taste relating to operations of the player.

It is preferable that, in the case where the cursor reaches the operation instruction icon corresponding to one of the one or more branching point, the operation guidance display controller causes the image display apparatus to temporarily display a plurality of cursors so that the operation instruction icons respectively positioned at branch destinations of the branching point become selectable states by means of operational inputs from the player. Since the video game processing apparatus may have a configuration as described above, it is possible to present operation instructions to the player more clearly, and this makes it possible to improve the taste relating to operations of the player.

It is preferable that the video game processing apparatus further includes an operational skill calculator that calculates the level of operational skill of the player on the basis of the rate of operational inputs carried out by the player in accordance with the operation guidance displayed by means of the operation guidance display controller with respect to all of the operational inputs to the input section by the player. In this case, the operation guidance display controller causes the image display apparatus to display the operation instruction icons and the end display icons so as to change the number of branching points in accordance with a calculation result by means of the operational skill calculator. Since the video game processing apparatus may have a configuration as described above, it is possible to improve interest of the player in the video game while improving the taste relating to operations in accordance with the level of operational skill of the player.

It is preferable that the card-type icon display controller causes the image display apparatus to display the card type icons so as to change the number of card type icons in accordance with the calculation result by means of the operational skill calculator. Since the video game processing apparatus may have a configuration as described above, it is possible to improve interest of the player in the video game while improving the taste relating to operations in accordance with the level of operational skill of the player.

It is preferable that the operation guidance display controller causes the image display apparatus to terminate the display of the operation guidance in the case where it is determined that operational inputs to the input section by the player are not carried out within a predetermined period of time after the cursor is moved so as to indicate one of the operation instruction icons. Since the video game processing apparatus may have a configuration as described above, it is possible to improve the taste of the player relating to the operations, and it is possible to improve the interest of the player in the video game by stimulating player's will to continue to play the video game.

It is preferable that the privilege applier applies the privilege to the player character in the case where all of the display images of the card type icons displayed in the second specific region become exposed states in accordance with a predetermined condition. Since the video game processing apparatus may have a configuration as described above, it is possible to improve interest of the player in the video game while improving taste relating to operations of the player by using various other elements such as thought of the player and a condition of luck in addition to operational skill of the player.

It is preferable that the privilege is an icon to be utilized to activate a special attack for influencing a state or ability of an attack target character that the player character attacks, for example. Since the video game processing apparatus may have a configuration as described above, it is possible to increase variations of attack by the player character, and this makes it possible to improve interest of the player in the video game.

It is preferable that the operation guidance display controller causes the image display apparatus to terminate the display of the operation guidance in the case where it is determined that the player character suffers an attack from the attack target character during the display of the operation guidance. Since the video game processing apparatus may have a configuration as described above, it is possible to improve taste relating to operations, and it is possible to improve the interest of the player in the video game by stimulating player's will to continue to play the video game.

It is preferable that each of the operation instruction icons is an icon representing any one of input keys with which the input section is provided. Since the video game processing apparatus may have a configuration as described above, it is possible to present an operation method to the player easily and clearly, and this makes it possible to improve the taste relating to operations of the player.

Further, according to another aspect of the present invention, the present invention is directed to a method of processing a video game by causing an image display apparatus to display a player character of the video game on an image display screen of the image display apparatus. In this case, the method controls progress of a video game by controlling an action of the player character to be displayed on the image display screen in accordance with an operation by a player. The method of the present invention includes receiving action specification of the player character in response to an action specification operation by the player.

The method also includes causing the image display apparatus to display an operation guidance in a first specific region of the image display screen in the case where specific action specification is received in the receiving action specification of the player character, the operation guidance being constituted from a plurality of operation instruction icons and a plurality of end display icons, the plurality of operation instruction icons being continuously arranged via one or more branching point in a state that the plurality of operation instruction icons can in turn be selected so as to cause the player to regularly and sequentially continue to carry out operational inputs with an input section, the plurality of end display icons respectively presenting specific images that indicates selected end positions to which the plurality of operation instruction icons lead.

The method also includes causing the image display apparatus to display a plurality of card type icons each having a display image in a second specific region of the image display screen, the display images respectively indicating the specific images presented by the plurality of end display icons, wherein, in the case where it is determined that the player carries out the operational inputs regularly and sequentially so as to select the plurality of operation instruction icons in accordance with the operation guidance displayed on the image display screen in the causing the image display apparatus to display the operation guidance and one of the plurality of end display icons is thereby reached when the card type icon having the display image that indicates the specific image presented by the one end display icon is displayed in the second specific region, and causing the image display apparatus to display the display image of the card type icon so as to become an exposed state at least temporarily.

The method also includes applying a privilege relating to a special effect to the player character in the case where all of the display images of the plurality of card type icons displayed in the second specific region in the causing the image display apparatus to display the plurality of card type icons keep the exposed states for a predetermined period of time.

Moreover, according to still another aspect of the present invention, the present invention is directed to a computer program product for processing a video game. In this case, progress of the video game is controlled by causing an image display apparatus to display a player character of the video game on an image display screen of the image display apparatus, and controlling an action of the player character to be displayed on the image display screen in accordance with an operation by a player. The computer program product of the present invention causes a computer (for example, the video game apparatus 100, including the video game apparatus main body 10) to execute steps including receiving action specification of the player character in response to an action specification operation by the player.

The steps also include causing the image display apparatus to display an operation guidance in a first specific region of the image display screen in the case where specific action specification is received in the receiving action specification of the player character, the operation guidance being constituted from a plurality of operation instruction icons and a plurality of end display icons, the plurality of operation instruction icons being continuously arranged via one or more branching point in a state that the plurality of operation instruction icons can in turn be selected so as to cause the player to regularly and sequentially continue to carry out operational inputs with an input section, the plurality of end display icons respectively presenting specific images that indicates selected end positions to which the plurality of operation instruction icons lead.

The steps also include causing the image display apparatus to display a plurality of card type icons each having a display image in a second specific region of the image display screen, the display images respectively indicating the specific images presented by the plurality of end display icons, wherein, in the case where it is determined that the player carries out the operational inputs regularly and sequentially so as to select the plurality of operation instruction icons in accordance with the operation guidance displayed on the image display screen in the causing the image display apparatus to display the operation guidance and one of the plurality of end display icons is thereby reached when the card type icon having the display image that indicates the specific image presented by the one end display icon is displayed in the second specific region, and causing the image display apparatus to display the display image of the card type icon so as to become an exposed state at least temporarily.

The steps also include applying a privilege relating to a special effect to the player character in the case where all of the display images of the plurality of card type icons displayed in the second specific region in the causing the image display apparatus to display the plurality of card type icons keep the exposed states for a predetermined period of time.

According to the present invention, it is possible to improve taste or interest of the player relating to operations by using various other elements such as thought of the player and a condition of luck in addition to operational skill of the player when to create a rendition (or direction) by a special effect (for example, activation of a special technique in a battle and the like) in the video game. This allows interest of many players in the video game to be improved regardless of the operational skill of the player.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Preferred embodiments of a video game processing apparatus, a method and a computer program product for processing a video game according to the present invention will now be described in detail with reference to the appending drawings.

Figure 1:
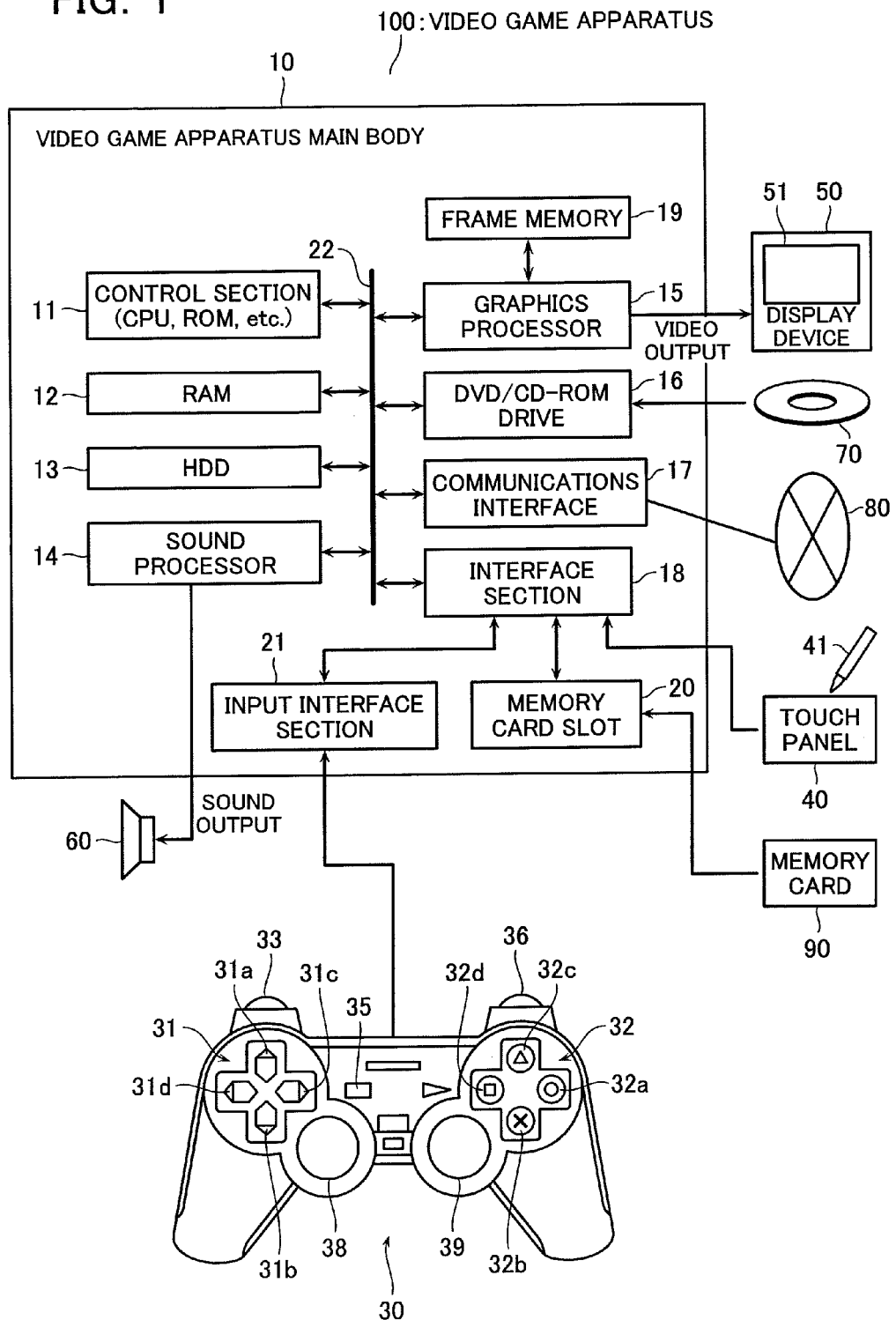
FIG. 1 is a block diagram that illustrates an example of a configuration of a video game apparatus to which an embodiment of the present invention is applied.

FIG. 1 is a block diagram that illustrates a configuration of a video game apparatus 100 to which an embodiment of the present invention is applied. However, those skilled in the art will readily recognize that other devices may be used without departing from the spirit or scope of the present invention.

As shown in FIG. 1, a video game apparatus 100 of the present embodiment includes a video game apparatus main body 10, a display device 50, and a sound output device 60. The video game apparatus main body 10 is constituted from a video game system that is put on the market, for example. Further, the display device 50 is constituted from, for example, a television apparatus, a liquid crystal display device, a micro-mirror device, a holographic display device, or any combination thereof. The display device 50 is provided with a plurality of image display screens including an upper image display screen 51 and a lower image display screen 52. However, those skilled in the art will readily recognize that any device capable of generating or reproducing an image may be used without departing from the scope or spirit of the present invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input interface section 21.

Each of the control section 11, the RAM (Random Access Memory) 12, the HDD (Hard Disk Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like. The control section 11 executes control processes of the whole video game apparatus 100 in accordance with control programs stored in the HDD 13 and/or a storage medium 70. The control section 11 includes an internal timer used to generate a timer interruption, for example. The RAM 12 is mainly used as a work area for the control section 11. The HDD 13 is a storage area in the video game apparatus main body 10 for storing the control programs and various data.

The sound processor 14 has a function of an audio input/output interface for carrying out D/A conversion and A/D conversion of a sound signal (or audio signal). The sound processor 14 is connected to a sound output device 60, which includes a speaker, for example, but may include any other device capable of generating or reproducing an audible signal. The sound processor 14 outputs a sound signal to the sound output device 60 in accordance with a sound outputting command from the control section 11 that executes a process according to the various control programs. Further, the sound processor 14 is also connected to a sound input device (not shown in the drawings) constituted from a microphone, for example. A sound signal from the sound input device is inputted into the sound processor 14 in accordance with a sound input command from the control section 11. In this regard, the sound output device 60 may be embedded in the display device 50 or the video game apparatus main body 10, or may be affixed to a vibrating surface that may be caused to generate the audible signal.

The graphics processor 15 is connected to the display device 50 including the upper image display screen 51 and the lower image display screen 52 on each of which an image is displayed. However, those skilled in the art will readily recognize that the graphics processor may be coupled to other known types of display devices, such as a head-mounted display, a holographic three-dimensional display or the like, without departing from the spirit or scope of the present invention. The graphics processor 15 develops an image on the frame memory 19 in accordance with a drawing or graphics command from the control section 11, and outputs video signals for displaying the image on the upper and lower image display screens 51, 52 to the display device 50. A switching time for images to be displayed according to the video signals is set to 1/30 seconds per frame (for NTSC type displays), for example. However, the switching time may be any other frame rate (for example, 1/25 second per frame (for PAL type displays)) as those skilled in the art will appreciate without departing from the spirit or scope of the present invention.

A storage medium 70 such as a DVD-ROM medium or a CD-ROM medium, or equivalent, in which control programs for a video game are stored is mounted in the DVD/CD-ROM drive 16. The DVD/CD-ROM drive 16 executes a process for reading out various data such as control programs from the storage medium 70. The storage medium 70 may be, other than the DVD-ROM or the CD-ROM described above, various types of DVD (such as DVD-RAM, DVD-R, DVD-RW, DVD+R, DVD+RW or DVD+RDL) or various types of CD (such as CD-R or CD-RW). In this case, in place of or in addition to the DVD/CD-ROM drive 16, the video game apparatus main body 10 may be provided with a drive for executing processes to read out and/or write various kinds of data from and/or into the storage medium 70.

The communications interface 17 is connected to a communication network 80 such as the Internet, a local area network (LAN), a wide area network (WAN), or the like, in a wireless or wired manner. The video game apparatus main body 10 carries out communication with, for example, another computer via the communication network 80 using a communication function of the communications interface 17.

Each of the input interface section 21, the memory card slot 20 and a touch panel 40 as an operation input section (or controller) is connected to the interface section 18. The interface section 18 causes instruction data from the input interface section 21 and instruction data from the touch panel 40 to be stored in the RAM 12 on the basis of operation(s) of a controller device such as a keypad 30 and operation(s) of the touch panel 40 using a touch pen 41 by a player of the video game apparatus 100. In response to the instruction data stored in the RAM 12, the control section 11 executes various arithmetic processing.

In this regard, the touch panel 40 may be used so as to be laminated on at least one of the upper and lower image display screens 51, 52, for example. In this case, the control section 11 recognizes (or senses) input information in accordance with operational inputs by operation(s) for inputs from the player by managing and controlling display timing on at least one of the upper and lower image display screens 51, 52 on which the touch panel 40 is laminated, operation timing to the touch panel 40 using the touch pen 41 or the like, and the position coordinates of the touch panel 40 with which the touch pen 41 is in contact.

By laminating the touch panel 40 on at least one of the upper and lower image display screens 51, 52 in this manner, the player is allowed to input much information along with the keypad 30 without making the controller device (including the keypad 30) of the player bigger. Here, as the type of the touch panel 40, various types of conventional touch panels such as a resistive touch panel and a pressure-sensitive touch panel can be utilized.

The video game apparatus main body 10 is connected to the touch panel 40 via the interface section 18 as described above. The video game apparatus main body 10 is also connected to the controller device such as the keypad 30 as an operation input section (controller) via the input interface section 21. However, other types of controllers may be used without departing from the scope or spirit of the present invention.

As shown in FIG. 1, for example, a cross key 31, a group of buttons 32, a left joystick 38 and a right joystick 39 are arranged on the upper surface of the keypad 30. The cross key 31 includes an upper key 31*a*, a lower key 31*b*, a right key 31*c* and a left key 31*d*. The group of buttons 32 includes a circle button 32*a*, an X key 32*b*, a triangle key 32*c* and a square key 32*d*. Further, a select button 35 and a start button 37 are arranged at a connecting portion between a base on which the cross key 31 is arranged and a base on which the group of buttons 32 are arranged. In addition, multiple buttons such as an R1 button 36 and an L1 button 33 are arranged at the side surface of the keypad 30.

The keypad 30 constituted in this manner is provided with multiple switches respectively connected to the cross key 31, the circle button 32*a*, the X button 32*b*, the triangle button 32*c*, the square button 32*d*, the select button 35, the start button 37, the R1 button 36 and the L1 button 33. When pressing force is applied to any button, the corresponding switch is turned on. A detected signal in accordance with on/off of the switch is generated in the keypad 30, and detected signals are generated, respectively, corresponding to inclined directions of the left joystick 38 and the right joystick 39 in the keypad 30.

The two types of detected signals generated in the keypad 30 are outputted to the control section 11 via the input interface section 21 (through wired or wireless connection), by which detected information indicating that any button on the keypad 30 is pressed and detected information indicating the state of each of the left joystick 38 and the right joystick 39 are generated. In this way, operation instruction(s) (that is, operational inputs) by a user (player) using the keypad 30, for example, is supplied to the video game apparatus main body 10 (that is, the control section 11).

Further, the interface section 18 executes, according to the command(s) from the control section 11, a process to store data indicative of the progress of the video game stored in the RAM 12 into the memory card 90 installed in the memory card slot 20. The interface section 18 also executes processes to read out data on the video game stored in the memory card 90 at the time of suspending the video game and to transfer such data to the RAM 12, and the like.

Various data, such as control program data for performing the video game with the video game apparatus 100, are stored in the storage medium 70, for example. The various data, such as the control program data stored in the storage medium 70, are read out by the DVD/CD-ROM drive 16 in which the storage medium 70 is installed. The data thus read out are loaded onto the RAM 12.

The control section 11 executes, in accordance with the control program loaded on the RAM 12, various processes such as a process to output the drawing or graphics command to the graphics processor 15, and a process to output the sound outputting command to the sound processor 14. In this regard, the interim data generated in response to the progress of the video game (for example, data indicative of scoring of the video game, the state of a player character and the like) are stored in the RAM 12 used as a work memory while the control section 11 executes processing.

It is assumed that a three-dimensional video game according to an aspect of the present embodiment is a video game wherein multiple characters, including a player character (that is, PC: a character that moves in accordance with the operation of the keypad 30 and/or the touch panel 40 by the player), move on a field provided in a virtual three-dimensional space displayed on the upper and lower image display screens 51, 52, by which the video game proceeds. In this regard, it is assumed that the virtual three-dimensional space in which the field is formed is indicated by coordinates of the world coordinate system. Further, the field is defined by multiple surfaces, and coordinates of vertexes of the respective constituent surfaces are shown as characteristic points.

Next, an operation of the video game apparatus 100 according to an aspect of the present embodiment will now be described.

Here, in order to simplify the explanation of the operation of the video game apparatus 100, it is assumed that at least one player character PC and multiple non-player characters (which are moved in accordance with control processes of the video game apparatus 100 (more specifically, control processes of the control section 11), and hereinafter, referred to simply as "NPC") exist as objects that are movable in the virtual three-dimensional space. However, the explanations for any process other than the processes relating to the present invention are omitted, in particular. In this regard, in the present embodiment, video game control for a RPG is executed, but those skilled in the art will recognize and appreciate that changes to the present invention can be made without departing from the scope or spirit of the present invention.

Figure 2:
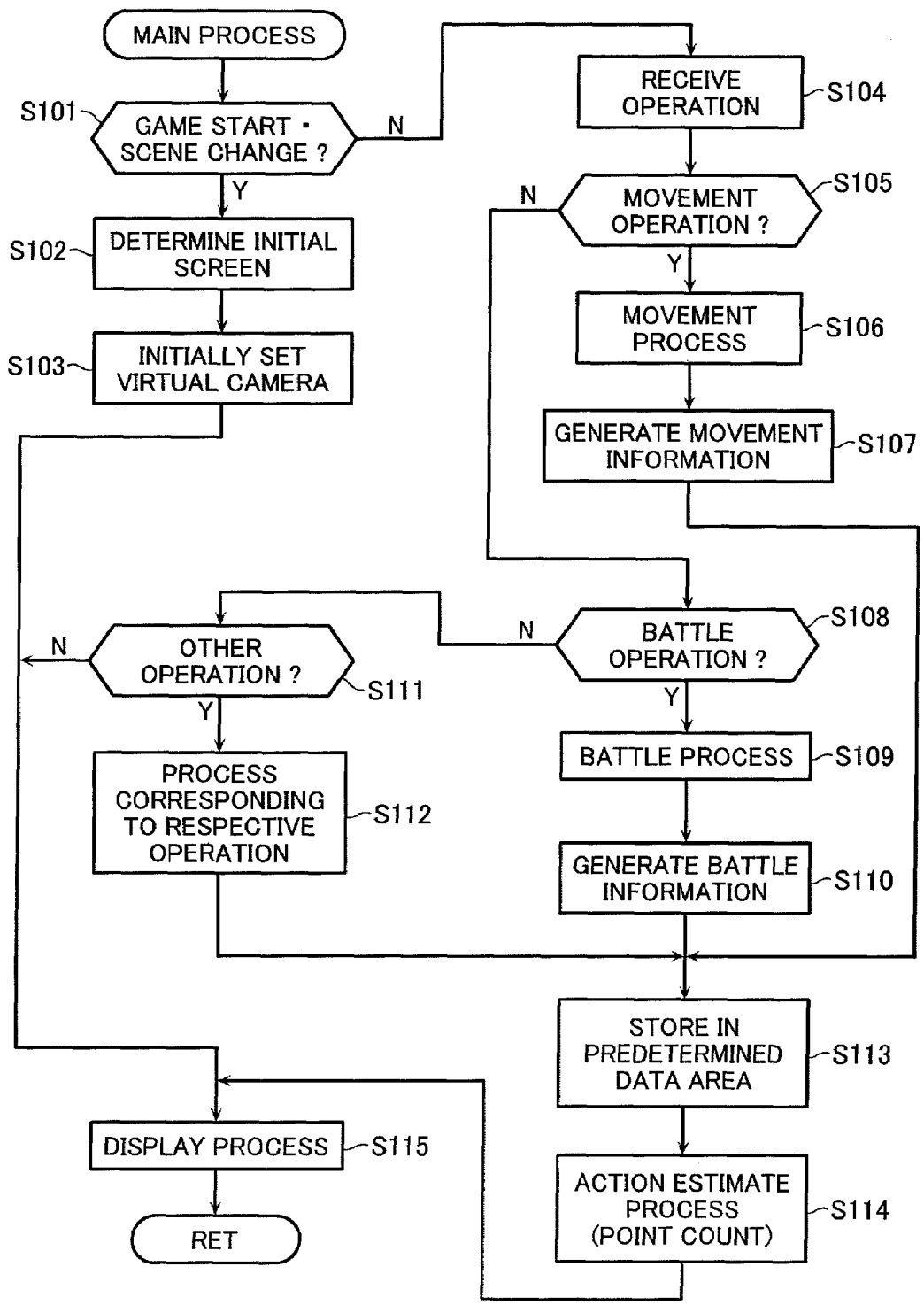
FIG. 2 is a flowchart that illustrates an example of a main process.

FIG. 2 is a flowchart that illustrates an example of a main process of the video game apparatus 100 according to the present embodiment. The main process is a process for generating an image for one frame and a process required for the control of the video game. The process is executed in accordance with a timer interruption at every $\frac{1}{30}$ second. However, it is to be noted that timing of at every $\frac{1}{30}$ second is only one example, as mentioned above. Instead, for example, the main process may be executed in accordance with a timer interruption at every single field period (every $\frac{1}{60}$ second) or at every two frame periods (every $\frac{1}{15}$ second), or any other appropriate field rate that may be recognized by those skilled in the art to be appropriate without departing from the scope or spirit of the present invention.

In the present embodiment, a video game (that is, a RPG game) proceeds in a common field (that is, a single field where a battle field and a movement field are not distinguished from each other) in which various actions (such as a battle action and/or a movement action), including the movement of the player character PC and a battle by the player character PC, are allowed. In the case where a predetermined object in the field is accomplished, one stage may be terminated and the processing may proceed to another stage executed in a next field.

Further, in the present embodiment, a same time base is applied to the respective characters existing in such a field. Once a NPC enters the stage in the field such as a battle scene, the NPC moves on the field or stands still on the field in accordance with the same time base until a hit point (which is a value indicating life force, and hereinafter, referred to simply as "HP") thereof becomes zero. For example, in the case where the HP becomes zero, the player character PC becomes a battle impossible state. Then, the video game is terminated, or other event occurs.

However, for example, in the case where a plurality of player characters PC enter the stage in the field, all of the plurality of player characters PC do not become a battle impossible state so long as the HP of each of the plurality of player characters PC becomes zero. In this case, a portion displayed on each of the upper and lower image display screens 51, 52 as a character image is a portion that exists within the field of view of a virtual camera in the field.

In the main process, the control section 11 determines whether an instruction to start a video game is generated through an operation of the keypad 30 and/or the touch panel 40, via manipulation of the controller 30 by the player or not in the case where the state is still before the video game start. Alternatively, once the video game has started or is in progress, the control section 11 determines whether a timing state is reached to change the scene (for example, change the field) or not in the case where the state is during execution of the video game (Step S101). In this regard, the "instruction to start the video game" means an instruction to start the video game by selecting a "game start" button when a selection menu including the "game start" button, a "demonstration" button and the like is displayed on the upper or lower image display screen 51, 52. For this reason, two opening movies are prepared. Namely, they include one in the case where the one opening movie is reproduced before starting the video game (that is, in the case where the one opening movie is automatically reproduced by means of power activation (or switch ON)) and the other in the case where the other opening movie is reproduced after starting the video game (that is, in the case where the other opening movie is reproduced in response to an instruction to start the video game from the player).

The timing state to change the scene which is determined at Step S101 is, for example, the time at which a virtual three-dimensional space illustrating a new scene is displayed on the respective upper and lower image display screens 51, 52 in order to finish the scene that has been displayed on the respective upper and lower image display screens 51, 52 until that point (for example, a scene displayed by means of a virtual three-dimensional space, and a scene displayed by means of a directorial moving image) and to switch the displayed scene to the new scene.

In the case where it is determined that an instruction to start a video game is generated or that the timing state reaches a state to change the scene ("Yes" at Step S101), the control section 11 determines an initial screen (an initial screen shown at the time of a start of the video game, or an initial screen shown at the time of a change in the scene) in accordance with the control program (Step S102). In this regard, the "initial screen shown at the time of the start of the video game" means a screen initially displayed when there is an instruction to start the video game from the player, for example. Further, the "initial screen shown at the time of the change in the scene" means a screen initially displayed at a new stage when the current stage is cleared and processing flow shifts to the new stage (that is, the timing state reaches a state to change the scene).

In this case, various data, such as image data used for the video game and characters or icons, are stored in the storage medium 70. At Step S102, an initial display position of the player character PC in an initial screen or a scene after a scene change (for example, a new stage in the RPG), a non-player character NPC or non-player characters NPCs to be displayed, an initial display position of each of the non-player characters NPCs to be displayed, an icon or icons to be displayed, an initial display position of each of the icons to be displayed and the like are determined in accordance with the control program.

Subsequently, the control section 11 determines a viewpoint position of a virtual camera, a direction of a visual axis, and a size of a visual angle in accordance with the control program. The control section 11 then executes an initial setup for the virtual camera to execute a perspective transformation (Step S103). Then, the processing flow proceeds to Step S115.

On the other hand, in the case where it is determined that the video game is executed, and it is not time to change the scene ("No" at Step S101), the control section 11 receives instruction data in accordance with the operation of the keypad 30 and/or the touch panel 40 by the player (Step S104). Namely, the control section 11 determines whether or not instruction data for executing movement of the player character PC or the like are inputted from the keypad 30 and/or the touch panel 40 via the input interface section 21. In the case where effective instruction data (that is, it means that such effective instruction data are instruction data that is allowed to be received by the control section 11) are inputted, the control section 11 receives the effective instruction data.

In the present embodiment, for example, the video game apparatus 100 is in advance constructed so that the player character PC displayed on the upper image display screen 51 can be operated by means of the keypad 30, while the player character PC displayed on the lower image display screen 52 can be operated by means of the touch panel 40. Further, the player character PC displayed on the upper image display screen 51 is set so as not to be allowed to move, and the processes at Steps S105 to S107 are applied only to the player character PC displayed on the lower image display screen 52. In this regard, in the present embodiment, the player characters PCs that can respectively be operated by means of the keypad 30 and the touch panel 40 may be switched to each other. The player characters PCs that can be operated may be set to be different from each other in accordance with each of the cross key 31 and the group of buttons 32 of the keypad 30 or each of detection regions in the case where the touch panel 40 are divided into the plurality of detection regions.

In the case where the control section 11 receives instruction data for instructing an action of the player character PC relating to the movement of the player character PC (that is, movement instruction data: selection of a movement instruction by a movement command to the touch panel 40 by the touch pen 41 or movement instruction to the player character PC displayed on the lower image display screen 52 (that is, on the touch panel 40) by means of the touch pen 41) in accordance with the operation of the touch panel 40 relating to the movement of the player character (movement operation) at Step S104 ("Yes" at Step S105), the control section 11 executes a movement process in accordance with the movement instruction data thus received (Step S106).

In the movement process at Step S106, the control section 11 causes the position of the player character PC to be moved in a virtual space (on the present field) in accordance with the received movement instruction data. In this regard, such a movement command may include a dash instruction command, for example. The dash instruction command is a command to move the player character PC quickly, and a command for supplying an instruction that the player character PC moves from a predetermined region of a battle area toward other region quickly if the player character PC is in a melee, for example.

Subsequently, the control section 11 generates movement information on the basis of the position information of the player character PC derived along with the movement process (Step S107). Namely, in accordance with the movement of the position of the player character PC by means of the movement process, the control section 11 updates necessary data among data on the viewpoint position of the virtual camera, data on the direction of a visual axis, data on the size of a visual angle, and the like. The control section 11 then changes the setting content of the virtual camera.

The movement information generated at Step S107 includes various kinds of information on the movement such as the position of the player character PC after the movement, the viewpoint position of the virtual camera, the direction of the visual axis, and the size of the visual angle changed along with the movement of the player character PC as well as the information on the movement of the player character PC. Then, the processing flow proceeds to Step S113.

In the case where the control section 11 receives instruction data for instructing an action for the player character PC relating to a battle (that is, battle instruction data: a battle command) in accordance with the operation of the keypad 30 and/or the touch panel 40 by the player for instructing the action of the player character relating to a battle (a battle operation) at Step S104 ("Yes" at Step S108), the control section 11 executes a battle process in accordance with the received battle instruction data (Step S109).

More specifically, in the video game apparatus 100 of the present embodiment, in the case where the operational inputs to direct the player character PC to the direction in which an enemy character is displayed from the display position of the player character PC is carried out using the cross key 31 and/or the group of buttons 32 of the keypad 30, the control section 11 determines that the instruction data is received ("Yes" at Step S108), and then executes the battle process (Step S109). In the battle process executed at Step S109, the control section 11 executes, for example, a process to determine a battle result and/or battle development between an enemy character (that is, a non-player character to battle against) and the player character PC, and the like.

Subsequently, the control section 11 generates battle information on the basis of the battle result and/or battle development determined by means of the battle process (Step S110). Namely, in accordance with the battle result and/or battle development by the battle process, the control section 11 updates and sets necessary information. The set information may include, for example, the name of the player character PC that battles an enemy character in the battle process, the name of the enemy character, battle development information, battle result information, a parameter (or parameters) that defines the ability (or abilities) of the player character PC, and the like. The battle information includes various kinds of information on the battle, such as the name of the player character PC that battles the enemy character, the name of the enemy character, battle development, battle result thereof, and a parameter that defines the ability of the player character PC. Then, the processing flow proceeds to Step S113.

In the case where the control section 11 receives instruction data for other instructions (that is, other instruction data: another command) in accordance with the operation of the keypad 30 and/or the touch panel 40 for executing other instruction (other operation) at Step S104 ("No" at Step S105, "No" at Step S108, and "Yes" at Step S111), the control section 11 executes a process (for example, a conversation between characters, a purchase action, a pick up action, a movement action of an item and the like) in accordance with the other instruction data thus received (Step S112). The other information corresponding to the process result at Step S112 is then generated, and the processing flow proceeds to Step S113.

The control section 11 updates the current position of the player character PC by storing the movement information generated at Step S107 in a predetermined data area of the RAM 12 at Step S113. Further, the control section 11 memorizes and stores various action histories of the player character PC by storing the battle information generated at Step S110 and the other information generated after Step S112 in a predetermined data area of the RAM 12 at Step S113.

Subsequently, the control section 11 executes an action estimate process on the basis of the information indicating the action histories of the player character PC once stored in the RAM 12 (Step S114). More specifically, information required to be digitized is digitized using conversion tables prepared in advance. Further, with respect to information required to be weighted, a score is calculated by multiplying the digitized value by a predetermined coefficient and summing these multiplied digitized values. The calculated score is added to a previous score stored in a predetermined data area of the RAM 12, and the added score is again stored in the predetermined data area. In this way, the score is updated as estimate information.

Then, the control section 11 perspectively transforms the virtual three-dimensional space including the player character PC and the non-player characters NPCs to be displayed from the virtual camera onto the virtual screen in accordance with the setting contents of the virtual camera and the like. The control section 11 then executes a display process to generate a two-dimensional image to be displayed on the upper and lower image display screens 51, 52 (Step S115).

When the display process is terminated, this main process is also terminated. Then, when a timer interruption is generated at the time of a start of a next frame period, a next main process is executed (that is, the main process is repeated). By repeatedly executing the main process, a character image is switched or shifted every frame period, and a moving image (animation) is resultantly displayed on the upper and lower image display screens 51, 52.

Now, the display process at Step S15 will be briefly described. At Step S115, the control section 11 first transforms at least the coordinates of the vertexes of respective polygons included within a range to be perspectively transformed on the virtual screen among the coordinates of the vertexes of polygons constituting the virtual three-dimensional space, in which the player character PC and the three-dimensional non-player characters NPCs are included, from the coordinates of the world coordinate system to the coordinates of the viewpoint coordinate system.

Subsequently, the control section 11 transmits the coordinates of the vertexes of the polygons of the player character PC and the non-player characters NPCs in the viewpoint coordinate system to the graphics processor 15, thereby outputting a drawing or graphics command to the graphics processor 15.

When the drawing or graphics command is inputted to the graphics processor 15, the graphics processor 15 updates, on the basis of the coordinates of the viewpoint coordinate system, the content of the Z buffer so that data on the points that reside at the front side are retained with respect to each of points constituting respective surfaces. When the content of the Z buffer is updated, the graphics processor 15 develops image data on the points that reside at the front side on the frame memory 19. Moreover, the graphics processor 15 executes some processes such as a shading process and a texture mapping process with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals outputted from the graphics processor 15 on the upper and lower image display screens 51, 52. By switching images displayed on the upper and lower image display screens 51, 52 every single frame period, the player can see images including the state in which the player character PC and/or the non-player characters NPCs are moved on the field and perceive the images as moving images.

In the video game apparatus 100 of the present embodiment, in connection with the battle process at Steps S108 to S110 described above, for example, in the case where the player carries out operational inputs to cause the player character PC described above to execute a specific action using the keypad 30 and then carries out operational inputs in accordance with the operation guidance displayed on the display screen, this realizes a new game element in which a privilege relating to the special effect during the execution of the video game is applied to the player character PC.

More specifically, the video game apparatus 100 of the present embodiment adopts a technique in which the video game proceeds while the plurality of player characters PC, for example, including two player characters PC respectively displayed on the upper and lower image display screens 51, 52 of the display device 50 are caused to cooperate with each other by respectively operating the two player characters via the keypad 30 and the touch panel 40 by the plurality of players. In this regard, hereinafter, in the present embodiment, processes when the player character PC displayed on the upper image display screen 51 is mainly operated will be described.

Here, as the privilege to be applied to the player character PC, a special technique activating icon(s) and the like are concretely mentioned. The special technique activating icon is displayed on at least one of the upper and lower image display screens 51, 52 to activate a so-called special technique that is a special attack to influence a state and/or ability of an enemy character to be attacked (that is, an attack target character) (for example, an attack whose offensive power is greater than that of a normal attack).

Next, a special technique activation related process in the battle process at Step S109 described above including application of such a privilege will be described which is executed in the video game apparatus 100 of the present embodiment. In this regard, the special technique activation related process is a process that the player character PC is allowed to activate a special technique by meeting a predetermined special technique activation condition during the battle process at Step S109 in the flowchart shown in FIG. 2. The special technique activation related process may be repeatedly executed at Step S109.

Figure 3:
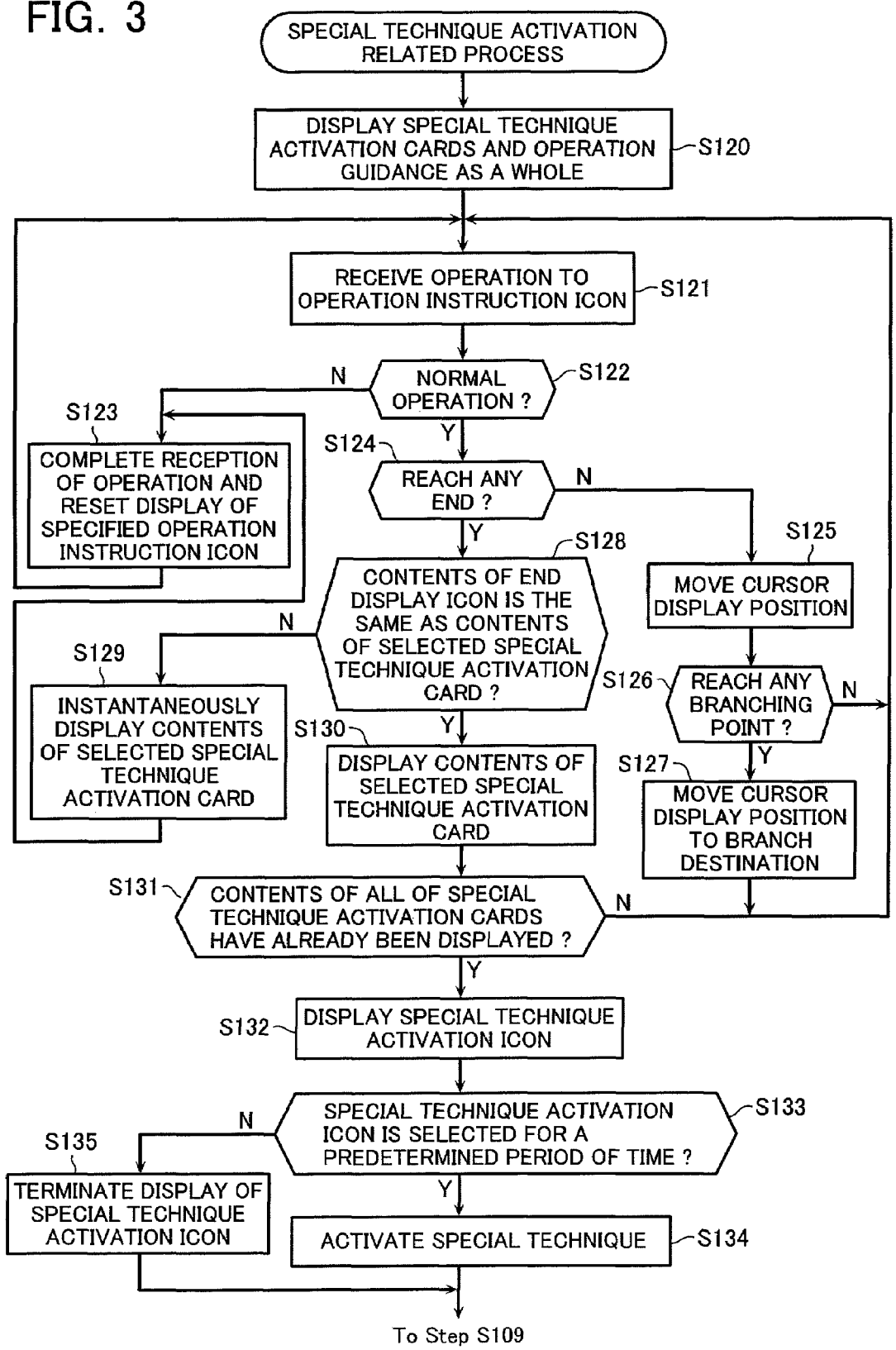
FIG. 3 is a flowchart that illustrates an example of a special technique activation related process.

FIG. 3 is a flowchart that illustrates an example of a special technique activation related process in the video game apparatus 100 of the present embodiment. Here, the case where the special technique activation related process is executed in response to an action relating to a specific attack of the player character PC against an enemy character will be described as an example.

As a premise of the execution of the special technique activation related process, the case where the battle operation is executed at Step S108 in the flowchart shown in FIG. 2, and the player carries out the operational inputs at Step S109 so that the player character PC is caused to execute a specific action, whereby the control section 11 receives special technique activation instruction data as battle instruction data will first be described. FIGS. 4 and 5 are explanatory drawings for explaining operations to execute the special technique activation related process in the video game apparatus 100 of the present embodiment. In this regard, FIGS. 4 and 5 show the case of becoming a battle mode (battle scene) in which the player character PC battles against an enemy character.

Figure 4A:
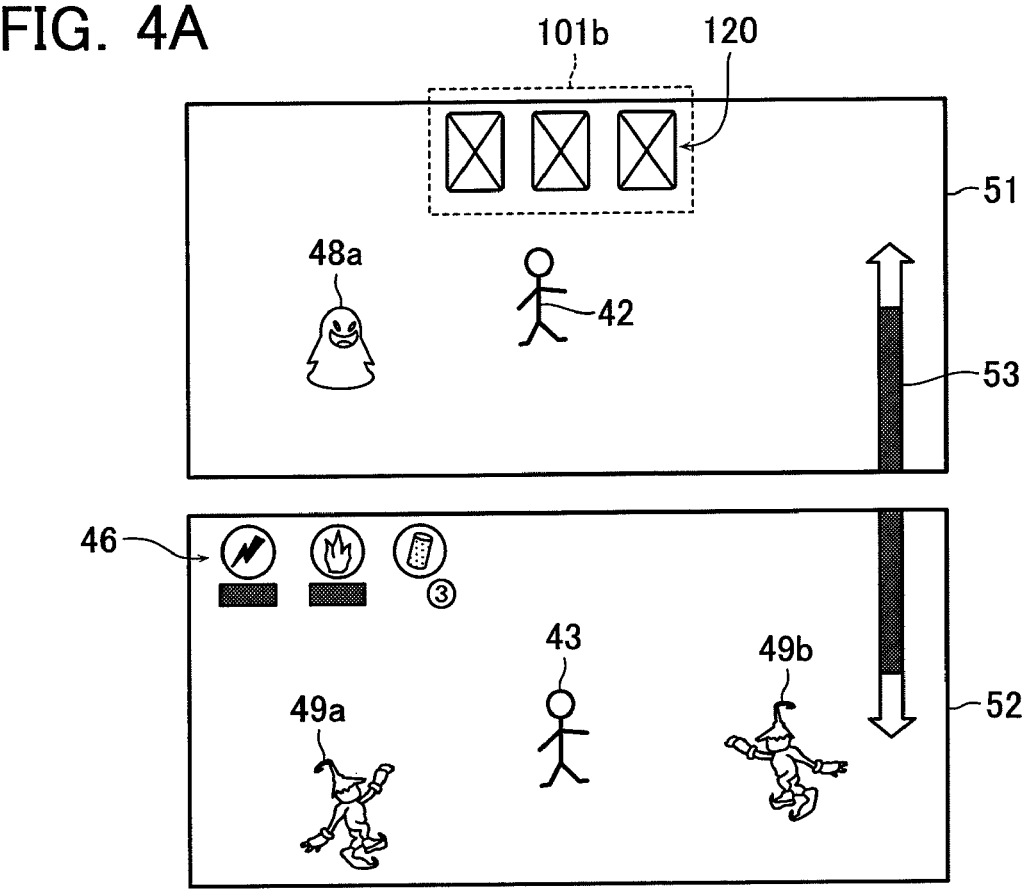
FIG. 4 is an explanatory drawing for explaining operations to execute the special technique activation related process.

As shown in FIG. 4A, for example, on the upper image display screen 51 of the display device 50, during a battle, a player character 42 is displayed in the vicinity of the center of the upper image display screen 51, and an enemy character 48a is displayed at the left side from the player character 42. Further, a group of card type icons 120 is displayed in a card display region 101b (as a second specific region) at an upper middle side of the upper image display screen 51. The card type icons 120 are displayed so that a display image indicating a specific image presented by each of end display icons of operation guidance (will be described later) is in a hidden (or closed) state (that is, in the case where one surface of one card type icon 120 on which a display image is drawn is a front surface, the other surface, that is, a back surface of the card type icon 120 is normally displayed) at normal time (that is, at initial setup time) in the present embodiment. In this regard, the group of card type icons 120 may not be displayed in the card display region 101b until a special technique activation related process is started. Further, the group of card type icons 120 may be displayed in the card display region 101b so that each of the card type icons is not a hidden state but an exposed (or opened) state.

On the other hand, on the lower image display screen 52 of the display device 50, a player character 43 is displayed in the vicinity of the center of the lower image display screen 52, and two enemy characters 49a, 49b are displayed at both of the left and right sides of the player character 43. Further, a group of icons 46 is displayed at an upper left side of the lower image display screen 52. The group of icons 46 is utilized to cause the player to select any one of the icons 46 by abstractly expressing an attack, an item and the like that the player 43 can utilize.

Moreover, an HP gauge 53 is continuously displayed in the vicinity of right ends of the upper and lower image display screens 51, 52 for presenting the hit points of the player characters 42, 43. The HP gauge 53 is provided to display the HPs of the respective player characters 42, 43 in a shared state (that is, a state in combination of the HPs of the respective player characters 42, 43), and to display a change state of the whole HP in connection with transition of the HP of each of the player characters 42, 43 in a easily viewable state for the player.

In this regard, in the video game apparatus 100 of the present embodiment, the player carries out operations of the player character 42 on the upper image display section 51 using the keypad 30, while the player carries out operations of the player character 43 on the lower image display section 52 using the touch pen 41 with which the touch panel 40 laminated on the lower image display screen 52 is to be touched.

Figure 4B:
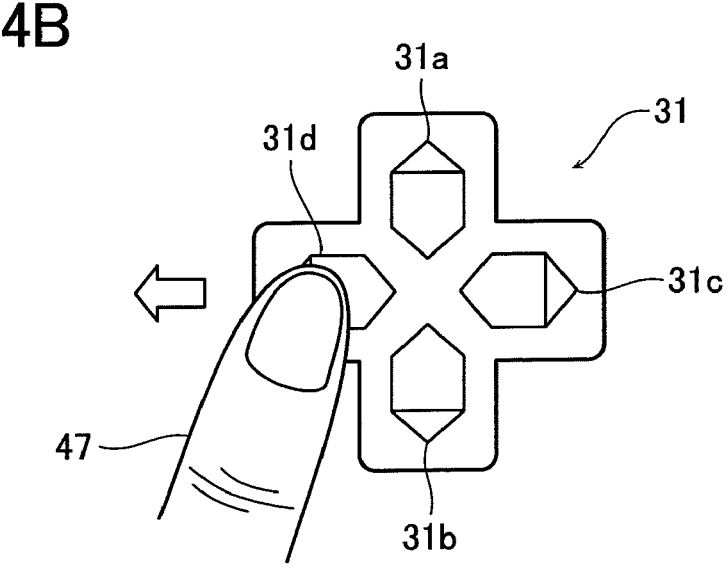

In the case where the player character 42 and the enemy character 48a are displayed on the upper image display screen 51 in a state as shown in FIG. 4A, for example, as shown in FIG. 4B, the player carries out input operations to press the left key 31d in the cross key 31 of the keypad 30 with one finger 47 of the player. The special technique activation related process is executed in the case where there are operational inputs in the direction indicating an outline arrow shown in FIG. 4B. Namely, in the case where the player inputs any button corresponding to the direction in which the enemy character 48a is positioned when viewed from the player character 42, the special technique activation related process is executed.

Figure 5A:
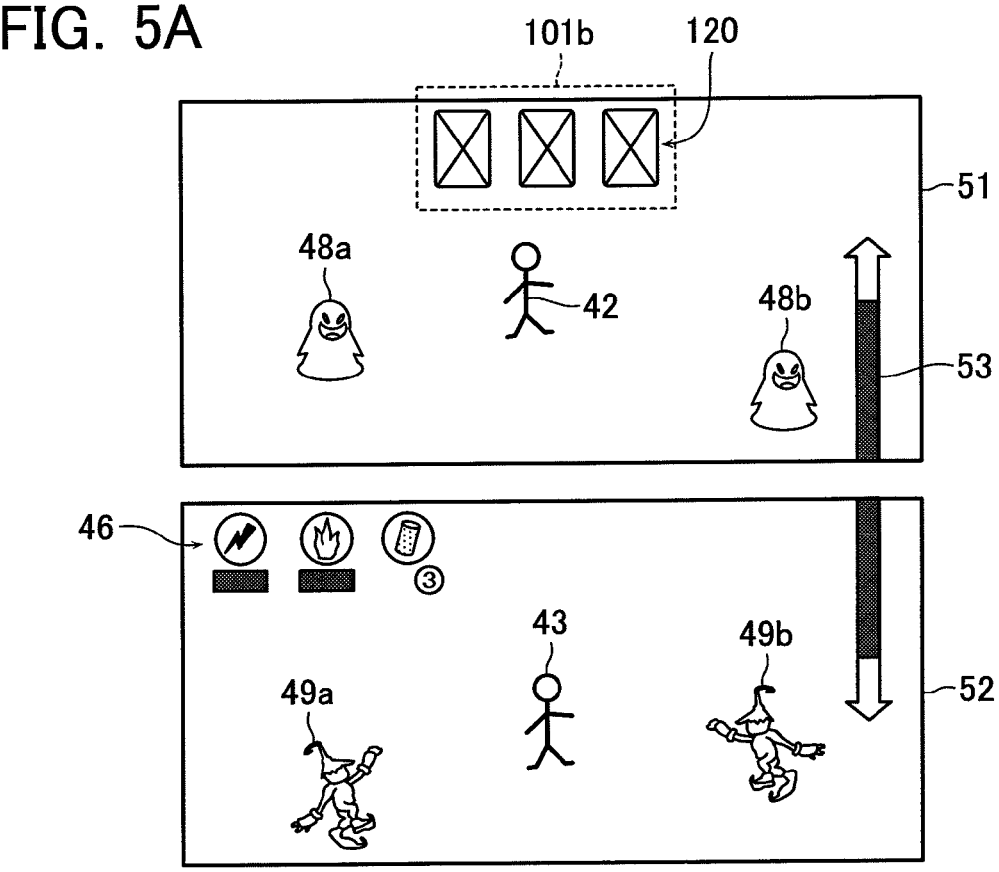
FIG. 5 is an explanatory drawing for explaining operations to execute the special technique activation related process.
Figure 5B:
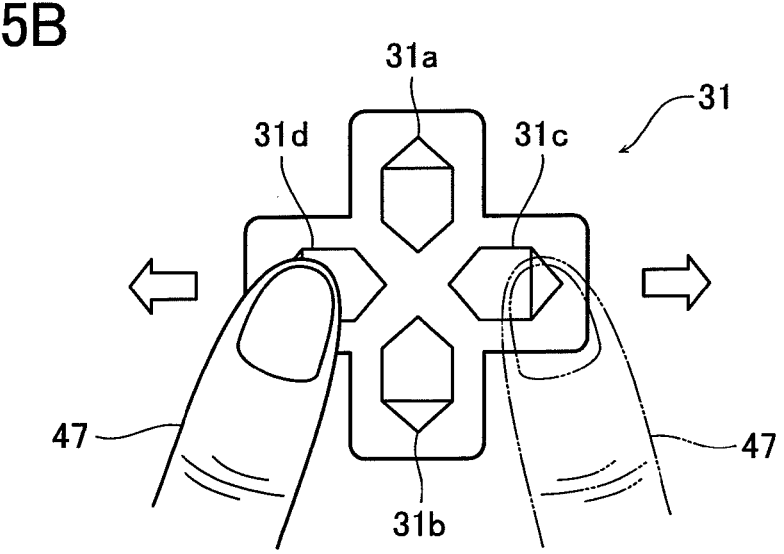

Further, as shown in FIG. 5A, in the case where two enemy characters 48a, 48b are displayed at both left and right sides of the player character 42 on the upper image display screen 51 of the display device 50 during a battle, as shown in FIG. 5B, the player carries out input operations to press either the left key 31d or the right key 31c in the cross key 31 of the keypad 30 with any one finger 47 of the player. The special technique activation related process is executed in the case where there are operational inputs in the direction indicating an outline arrow shown in FIG. 5B, to which any one of enemy characters 48a, 48b is positioned when viewed from the player character 42.

Figure 6:
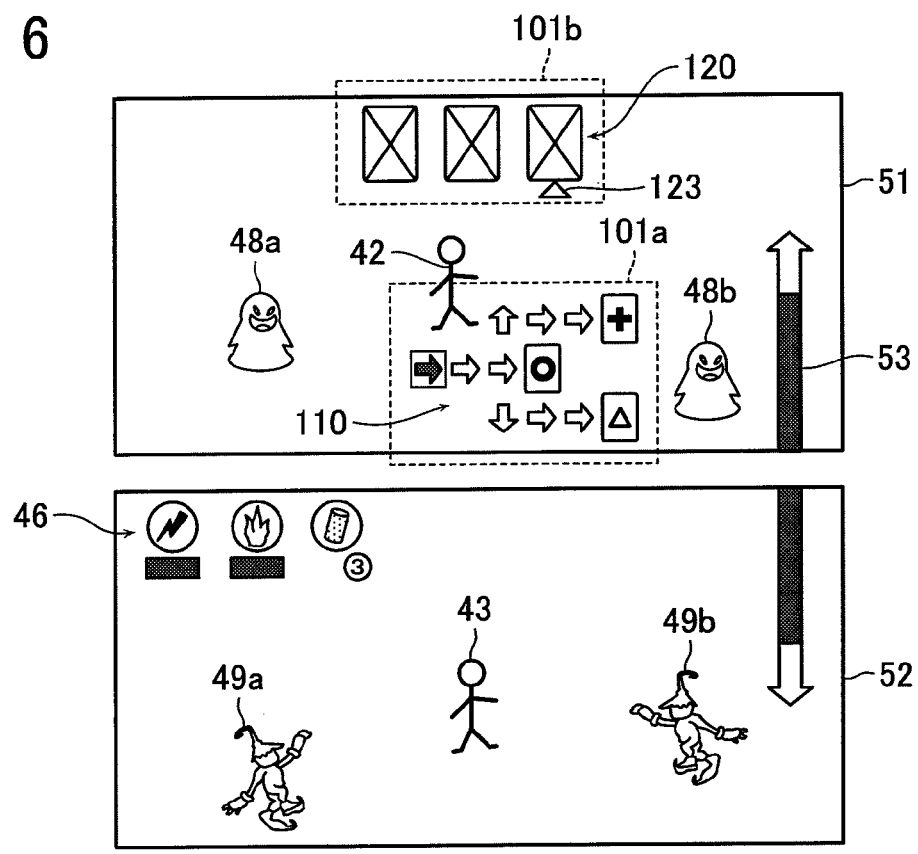
FIG. 6 is an explanatory drawing that shows a display example of a screen in the case where the special technique activation related process is executed.
Figure 7:
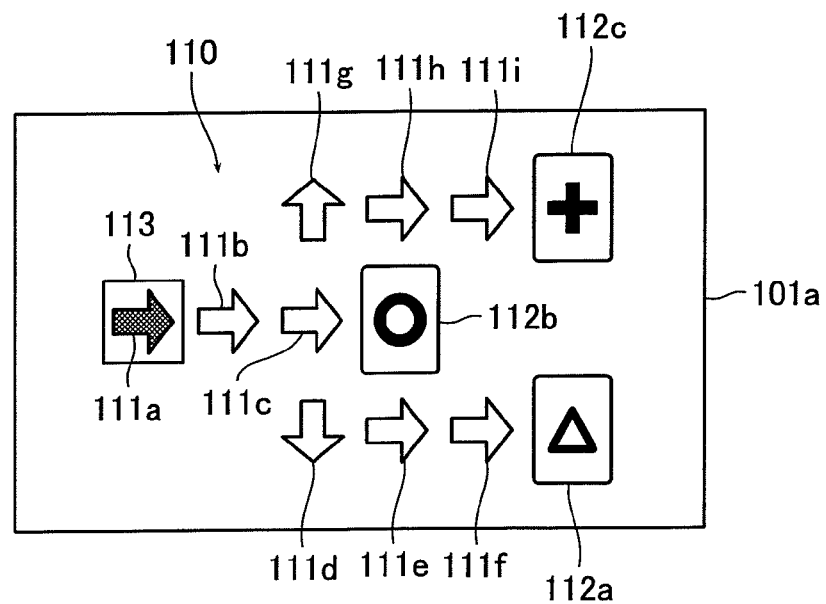
FIG. 7 is an explanatory drawing that shows an enlarged part of the display example of the screen shown in FIG. 6.
Figure 8:
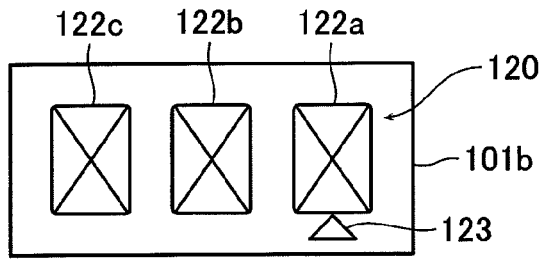
FIG. 8 is an explanatory drawing that shows an enlarged part of the display example of the screen shown in FIG. 6.
Figure 9:
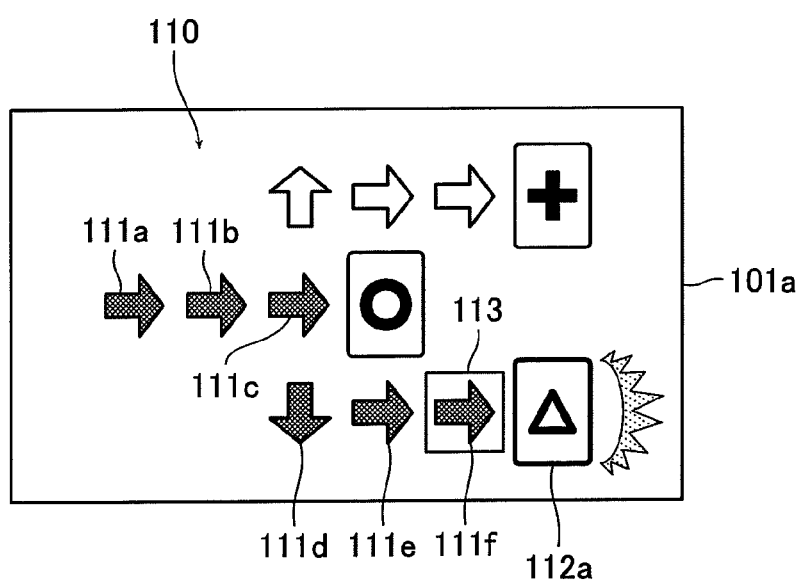
FIG. 9 is an explanatory drawing that shows an example of a display state of the display example of the screen shown in FIG. 7 during an actual action.
Figure 10:
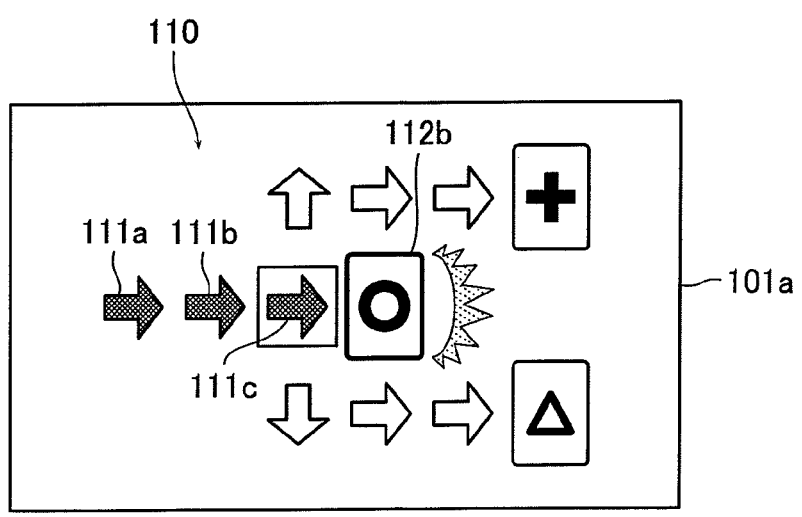
FIG. 10 is an explanatory drawing that shows an example of the display state of the display example of the screen shown in FIG. 7 during the actual action.
Figure 11:
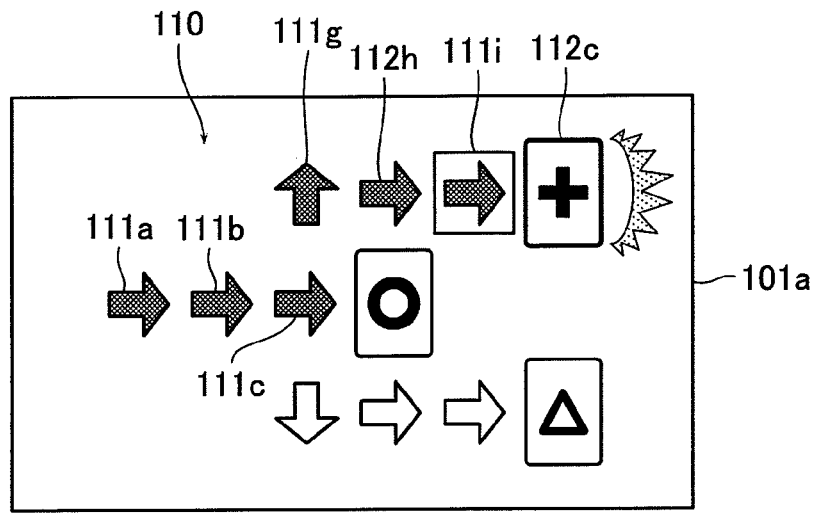
FIG. 11 is an explanatory drawing that shows an example of the display state of the display example of the screen shown in FIG. 7 during the actual action.

FIG. 6 is an explanatory drawing that shows a display example of a screen in the case where the special technique activation related process is executed in the video game apparatus 100 of the present embodiment. Each of FIGS. 7 and 8 is an explanatory drawing that shows an enlarged part of the display example of the screen shown in FIG. 6. Further, FIGS. 9 to 11 are explanatory drawings that show an example of a display state of the display example of the screen shown in FIG. 7 during an actual action. Moreover, FIG. 12 is an explanatory drawing that shows an example of the display state of the display example of the screen shown in FIG. 8 during the actual action.

As shown in FIG. 6, in the case where there are specific operational inputs to activate the special technique as described above by means of the player, the group of card type icons 120 is displayed in the card display region 101b on the upper image display screen 51. In addition, operation guidance 110 is displayed as a whole in an operation guidance display region 101a. The operation guidance display region 101a is a first specific region provided at a lower middle side of the upper image display screen 51, for example. The operation guidance is utilized to instruct the player to carry out operational inputs to the keypad 30 regularly and sequentially.

As shown in FIG. 7, the operation guidance 110 displayed in the operation guidance display region 101a is constituted from a plurality of operation instruction icons 111a to 111i and a plurality of end display icons 112a to 112c, for example. The plurality of operation instruction icons 111a to 111i are continuously arranged via a branching point in a state that the plurality of operation instruction icons 111a to 111i can in turn be selected so as to cause the player to regularly and sequentially continue to carry out the operational inputs using the cross key 31. The plurality of end display icons 112a to 112c respectively present specific images (here, "triangle", "circle" and "cross", for example) that indicates a plurality of end positions to be selected. Selecting the plurality of operation instruction icons 111a to 111i in turn lead to any one of the end display icons 112a to 112c of the end displays to be selected. Further, a cursor 113 is displayed, as a part of the operation guidance 110, in the operation guidance display region 101a. The cursor 113 is displayed so as to be capable of moving along the plurality of operation instruction icons 111a to 111i, for example. The cursor 113 is also displayed so as to point the operation instruction icon to be selected by means of the operational inputs from the player. In this regard, each of the end display icons 112a to 112c may have a different display form (for example, a form of a display frame of the icon), or have different contents of the specific image to be displayed (for example, "triangle", "circle" and "cross" as described above). To the contrary, each of the end display icons 112a to 112c may have the same display form and/or the same contents of the specific image.

Each of the plurality of operation instruction icons 111a to 111i is displayed so as to be any one of the shapes indicating arrows respectively corresponding to the upper key 31a, the lower key 31b, the right key 31c and the left key 31d in the cross key 31, for example. The cursor 113 is displayed as a rectangular shape so as to enclose any one of the operation instruction icons 111a to 111i.

On the other hand, as shown in FIG. 8, a plurality of special technique activation cards 122a to 122c and a prediction cursor 123 are displayed in the card display region 101b. The plurality of special technique activation cards 122a to 122c correspond to the group of card type icons 120 as described above, respectively. The prediction cursor 123 points out one of the special technique activation cards 122a to 122c, which is selected for prediction of the player by the control section 11 in accordance with a predetermined rule. In this case, the predetermined rule described above means, for example, that the display images of the special technique activation cards 122a to 122c, which are in the hidden states, are in turn changed into the exposed states in a direction from the right side to the left side or a direction from the left side to the right side. Further, the special technique activation cards 122a to 122c may be displayed in the card display region 101b so that the display images thereof are in the exposed states as they are.

Namely, when the special technique activation related process as described above is executed, as shown in FIG. 3, the control section 11 causes the display device 50 to display the plurality of special technique activation cards 122a to 122c and the operation guidance 110 as a whole in the card display region 101b and the operation guidance display region 101a of the upper image display screen 51, respectively (Step S120). The plurality of special technique activation cards 122a to 122c constitute the group of card type icons 120. The operation guidance 110 is constituted from the operation instruction icons 111a to 111i, the end display icons 112a to 112c and the cursor 113.

Subsequently, when the player operates the cross key 31, the control section 11 receives an operational input to any one of the operation instruction icons 111a to 111i (Step S121), and then determines whether or not the received operational input are a normal operation (Step S122). Here, the word "normal" of the normal operation means that the player precisely carries out an operational input in the entry sequence in accordance with an input operation instruction displayed and indicated by the respective operation instruction icons 111a to 111i of the operation guidance 110. More specifically, the normal operation includes the case as follows.

Namely, as shown in FIG. 7, in the case where the cursor 113 is displayed to select the operation instruction icon 111a indicating a right direction with the shape of the arrow so as to enclose the operation instruction icon 111a, the control section 11 determines that the operational input are a normal operation when the right key 31c of the cross key 31 is pressed by the player. On the other hand, when any other key of the cross key 31 is pressed by the player, the control section 11 determines that the operational input is not a normal operation. In this regard, in the case where the operational input is a normal operation, the display color of the operation instruction icon 111a is changed in order to indicate that the operation instruction icon 111a is precisely specified by the player, for example.

In the case where it is determined that the operational input is not the normal operation ("No" at Step S122), the control section 11 completes the reception of the operational input, and resets the display of the specified operation instruction icon (Step S123). The processing flow then shifts to the process at Step S121. Namely, in the case where it is determined that the operational input is not the normal operation, the control section 11 resets the display state of the respective operation instruction icons that have already been specified precisely, and the process at Step S123 is again executed in order to receive operational inputs from the beginning.

In the case where it is determined that the operational input is the normal operation ("Yes" at Step S122), the control section 11 determines whether or not any one of the end display icons 112a to 112c is reached by precisely carrying out the operational inputs for the operation instruction icons 111a to 111i by means of the player (Step S124). More specifically, for example, as shown in FIG. 9, in the case where the right key 31c of the cross key 31 is pressed by the player when the operation instruction icon 111f is selected by the cursor 113, the control section 11 causes the display device 50 to change the display of the end display icon 112a (for example, so as to be highlighted), and the control section 11 determines that the end display icon 112a is reached. Further, in the case where there is an operation instruction icon next to the operation instruction icon specified by the player, the control section 11 determines that any end is not reached.

In the case where it is determined that any end is not reached ("No" at Step S124), the control section 11 causes the display device 50 to move the display position of the cursor 113 to the position to select a next operation instruction icon (Step S125), and then determines whether or not any branching point of the operation instruction icons is reached (Step S126). In the case where it is determined that any branching point is not reached ("No" at Step S126), the processing flow shifts to the process at Step S121. On the other hand, in the case where it is determined that any branching point is reached ("Yes" at Step S126), the control section 11 causes the display device 50 to move the display position of the cursor 113 to the operation instruction icon that is a selectable branch destination (Step S127), and the processing flow shifts to the process at Step S121. More specifically, the cursor 113 is moved so as to be capable of selecting the operation instruction icon 111d and the operation instruction icon 111g.

In the case where it is determined that any end is reached ("Yes" at Step S124), the control section 11 determines whether or not the contents of the specific image of the end display icon is the same as the contents of the display image of the special technique activation card selected by the cursor 123 for prediction (Step S128). More specifically, for example, as shown in FIG. 9, in the case where the player precisely carries out the operational inputs for specifying the operation instruction icons 111a to 111f until the display position of the end display icon 112a, the control section 11 determines whether or not the specific image "triangle" of the end display icon 112a is the same as the contents of the display image of the special technique activation card 122a, which is shown in a hidden state as shown in FIG. 8, selected by the cursor 123 for prediction. In this case, the control section 11 determines that the contents are the same as each other in the case where the display image of the special technique activation card 122a indicates a "triangle" image when the display image becomes an exposed state. On the other hand, the control section 11 determines that the contents are not the same as each other in the case where the display image of the special technique activation card 122a indicates any other image than the "triangle" image.

In the case where it is determined that the contents of the display images are not the same as each other ("No" at Step S128), the control section 11 instantaneously displays the display image of the special technique activation card selected by the cursor 123 for prediction so as to switch the display image from the hidden state to the exposed state in the present embodiment, for example (Step S129). The contents of the display image are thus presented to the player temporarily, and then the processing flow shifts to the process at Step S123. Namely, in the case where the specific image of the selected one end display icon does not correspond with the display image of the special technique activation card selected by the cursor 123 for prediction as a result although the one end display icon has been selected by precisely carrying out the operational inputs relating to the specification of the operation instruction icon, the contents of the display image of the selected special technique activation card is temporarily presented for the player. Thus, a game element such as concentration (or memory) of a card game is supplied to the player.

In the case where it is determined that the contents of the display images are the same as each other ("Yes" at Step S128), the control section 11 causes the display device 50 to display the contents of the display image of the special technique activation card selected by the cursor 123 for prediction by changing the state of the special technique activation card from the hidden state to the exposed state (Step S130). The control section 11 then determines whether or not the contents of the display images of all of the special technique activation cards 122a to 122c have already been displayed (Step S131).

In the case where it is determined that the contents of the display images of all of the special technique activation cards 122a to 122c have not been displayed yet ("No" at Step S131), the processing flow shifts to the process at Step S121, and the control section 11 repeats the processes described above for other special technique activation card. In the case where it is determined that the contents of the display images of all of the special technique activation cards 122a to 122c have already been displayed ("Yes" at Step S131), the control section 11 causes the display device 50 to display a special technique activation icon for causing the player to select activation of a special technique, for example, in a predetermined region of the lower image display screen 52 (Step S132). Here, concrete operation states of the processes described above will be explained.

Figure 12A:
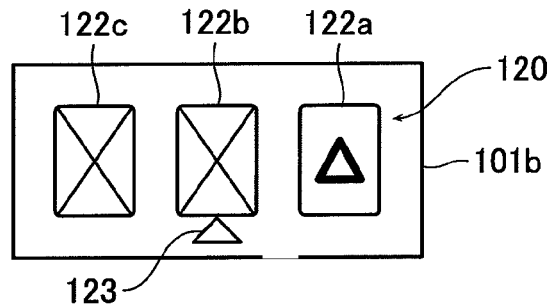
FIG. 12 is an explanatory drawing that shows an example of the display state of the display example of the screen shown in FIG. 8 during the actual action.
Figure 13:
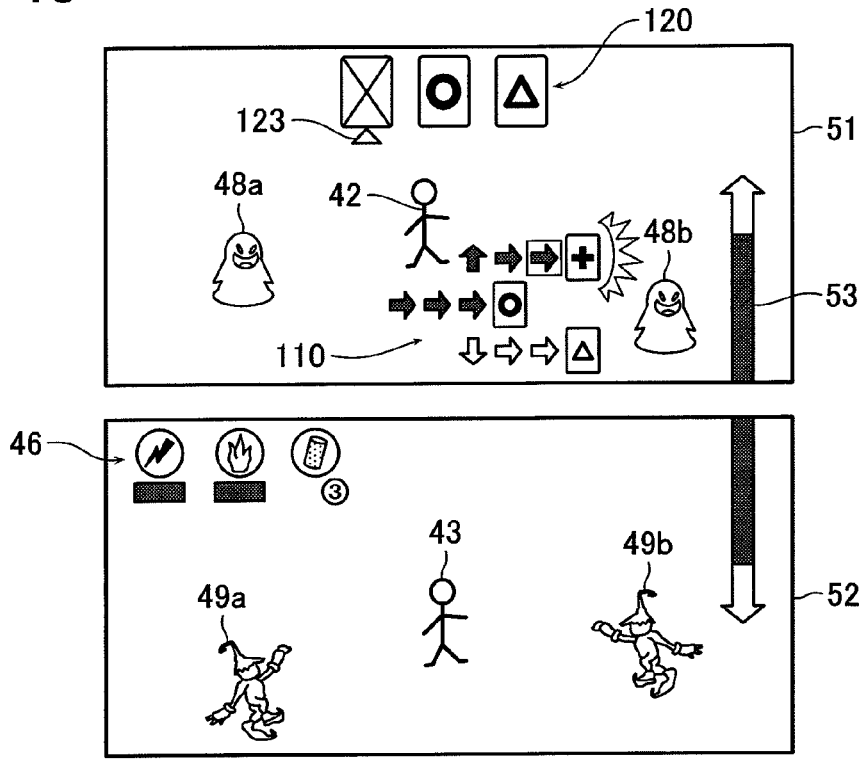
FIG. 13 is an explanatory drawing that shows another display example of the screen in the case where the special technique activation related process is executed.
Figure 14:
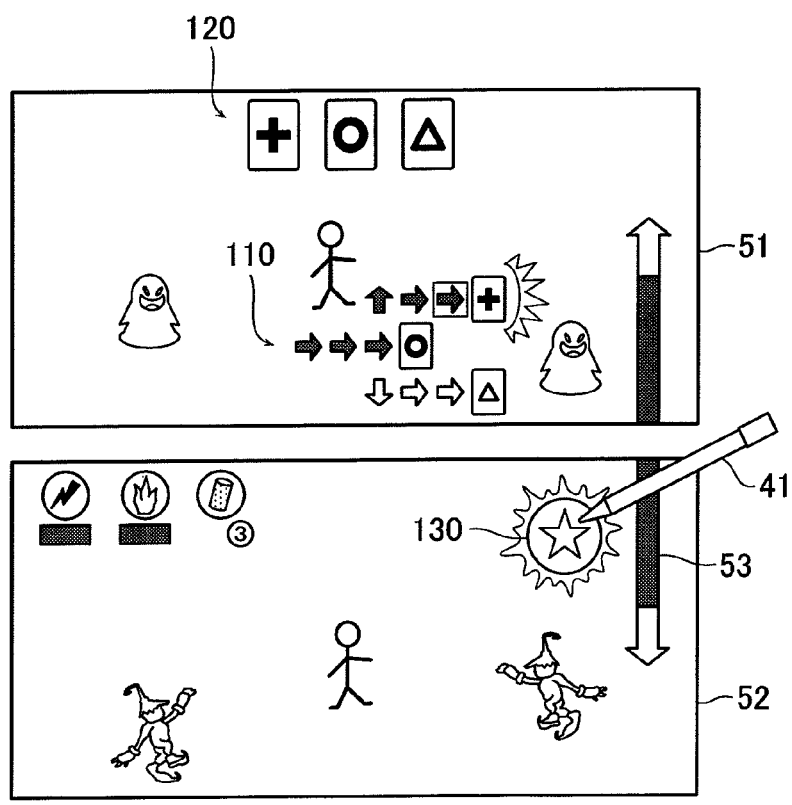
FIG. 14 is an explanatory drawing that shows another display example of the screen in the case where the special technique activation related process is executed.

FIGS. 13 and 14 are explanatory drawings that show another display example of the screen in the case where the special technique activation related process is executed in the video game apparatus 100 of the present embodiment. When the cursor 123 for prediction selects the special technique activation card 122a in the state as shown in FIG. 8, the player first carries out operational inputs in accordance with the operation instruction icons 111a to 111f as shown in FIG. 9 to specify the end display icon 112a. In the case where the contents of the specific image "triangle" of the end display icon 112a is the same as the contents of the display image of the special technique activation card 122a, which is in the hidden state, the display image "triangle" of the special technique activation card 122a is caused to be displayed in the exposed state as shown in FIG. 12A.

Subsequently, when the cursor 123 for prediction selects the special technique activation card 122b in the state as shown in FIG. 12A and the display image "triangle" of the special technique activation card 122a is displayed in the exposed state, the player carries out operational inputs in accordance with the operation instruction icons 111a to 111c as shown in FIG. 10 to specify the end display icon 112b. In the case where the contents of the specific image "circle" of the end display icon 112b is the same as the contents of the display image of the special technique activation card 122b, which is in the hidden state, the display image "circle" of the special technique activation card 122b is caused to be displayed in the exposed state as shown in FIG. 12B.

Figure 12B:
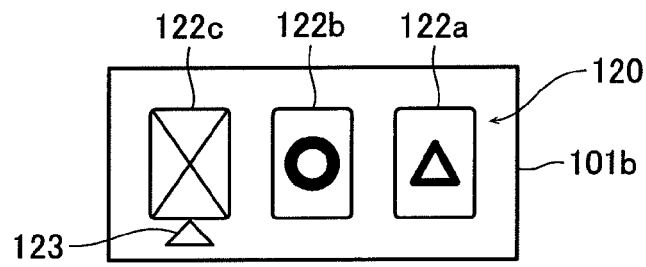
Figure 12C:
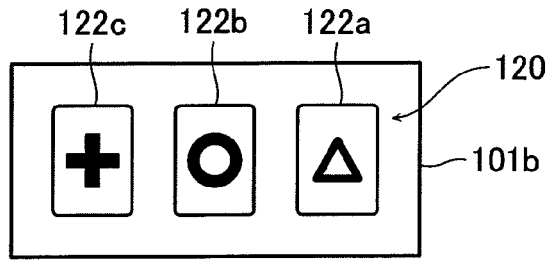

Subsequently, when the cursor 123 for prediction selects the special technique activation card 122c in the state as shown in FIG. 12B and each of the display images "triangle" and "circle" of the special technique activation cards 122a and 122b is displayed in the exposed state, the player carries out operational inputs in accordance with the operation instruction icons 111a to 111c and 111g to 111i as shown in FIG. 11 to specify the end display icon 112c. In the case where the contents of the specific image "cross" of the end display icon 112c is the same as the contents of the display image of the special technique activation card 122c, which is in the hidden state, the display image "cross" of the special technique activation card 122c is caused to be displayed in the exposed state as shown in FIG. 12C. The display images "triangle", "circle" and "cross" of all of the special technique activation cards 122a to 122c are displayed in this manner.

In this regard, when the cursor 123 for prediction selects the special technique activation card 122c in the state as shown in FIG. 12B and each of the display images "triangle" and "circle" of the special technique activation cards 122a and 122b is displayed in the exposed state, the display states of the group of card type icons 120 and the operation guidance 110 in the upper and lower image display screens 51, 52 become the states as shown in FIG. 13 at the moment when the player carries out operational inputs in accordance with the operation instruction icons 111a to 111c and 111g to 111i to specify the end display icon 112c.

Then, in the case where the special technique activation icon is displayed at Step S132 as described above, the display states of the upper and lower image display screens 51, 52 become the states as shown in FIG. 14. Namely, as shown in FIG. 14, the special technique activation icon 130 is displayed in the vicinity of the HP gauge 53 in the lower image display screen 52, for example.

In this case, when the special technique activation icon is displayed in this manner, the control section 11 determines whether or not the special technique activation icon 130 is selected for a predetermined period of time by the player using the touch pen 41 or the like (Step S133). In the case where it is determined that the special technique activation icon 130 is not selected for a predetermined period of time ("No" at Step S133), the control section 11 causes the display device 50 to terminate the display of the special technique activation icon 130. On the other hand, in the case where it is determined that the special technique activation icon 130 is selected for a predetermined period of time ("Yes" at Step S133), the control section 11 activates a special technique relating to a special rendition effect and the like (Step S134). The processing flow then shifts to the battle process at Step S109 described above.

As explained above, in the embodiment described above, the control section 11 receives action specification of the player character 42 in response to an action specification operation by the player. The control section 11 causes the display device 50 to display the operation guidance 110 in the operation guidance display region 101a of the upper image display screen 51 in the case where the control section 11 receives specific action specification (see Step S120), wherein the operation guidance 110 is constituted from the plurality of operation instruction icons 111a to 111i and the plurality of end display icons 112a to 112c, the plurality of operation instruction icons 111a to 111i are continuously arranged via one or more branching point in a state that the plurality of operation instruction icons 111a to 111i can in turn be selected so as to cause the player to regularly and sequentially continue to carry out operational inputs with the cross key 31, and the plurality of end display icons 112a to 112c respectively present specific images "triangle", "circle" and "cross" (whose display forms are different from each other) that indicate selected end positions to which the plurality of operation instruction icons 111a to 111i lead. The control section 11 causes the display device 50 to display the plurality of special technique activation cards 122a to 122c respectively having the display image "triangle", "circle" and "cross" in the card display region 101b of the upper image display screen 51 so as to be in the hidden states (see Step S120). The display images "triangle", "circle" and "cross" respectively indicate the specific images presented by the plurality of end display icons 112a to 112c. In the case where it is determined that the player carries out the operational inputs regularly and sequentially so as to select the plurality of operation instruction icons in accordance with the operation guidance 110 displayed on the upper image display screen 51 and one of the plurality of end display icons 112a to 112c is thereby reached (see Step S124) when the special technique activation card having the display image that indicates the specific image presented by the one end display icon is displayed in the card display region 101b (see Step S128), the control section 11 causes the display device 50 to display the display image of the special technique activation card so as to become an exposed state at least temporarily (see Steps S129 and S130). The control section 11 causes the display device 50 to selectably display the special technique activation icon 130 (see Step S132) so as to be capable of activating the special technique as a privilege relating to the special effect in the case where all of the display images "triangle", "circle" and "cross" of the plurality of special technique activation cards 122a to 122c displayed in the card display region 101b keep the exposed states for a predetermined period of time (see Step S131). Thus, it is possible to improve taste or interest of the player relating to operations by using various other elements such as thought of the player and a condition of luck in addition to operational skill of the player when to create a rendition (or direction) by a special effect (for example, activation of a special technique in a battle and the like) in the video game. This allows interest of many players in the video game to be improved regardless of the operational skill of the player.

In this regard, in the case where the video game is set so that the plurality of player characters 42, 43 execute a battle in cooperation with each other, a selection and execution right of the special technique activation icon 130 as described above may be applied to the player character PC other than the player character PC that has acquired an activation right of the special technique by means of the sequence of operations described above. Thus, the player is allowed to readily imagine (or think of) the process in which a battle proceeds in corporation with the plurality of player characters 42, 43.

Namely, the player can play the video game in order to activate the special technique, not merely to attack the enemy characters 48a, 48b, 49a, 49b and the like, by using not only the operational skill of the player relating to the operations but also the thought and memory of the player and the like. Thus, it is possible to improve the interest of the player in the video game while preventing the play of the video game from becoming monotonous.

For example, in order to activate the special technique, the player regularly and sequentially carries out operational inputs of the cross key 31 to select the specific image of the end display icon the same as the display image of the special technique activation card, which is in the hidden state, selected by the cursor 123 for prediction, and the display images of all of the special technique activation cards thereby become the exposed states. This makes it possible to cause the display device 50 to display the special technique activation icon 130. Thus, the player can play the video game to which operational technique of the keypad 30 and a game element such as concentration (or memory) of a card game are added. Therefore, it can be expected that it is possible to maintain and improve motivation to play the video game for either a game beginner or a game expert, in particular.

Further, in the embodiment described above, the video game apparatus 100 is constructed so that the display device 50 is caused to display the cursor 113 to be included in the operation guidance 110. In this case, the cursor 113 is displayed so as to be capable of moving along the plurality of operation instruction icons 111a to 111i and to point the operation instruction icon to be selected by means of the operational inputs from the player. Thus, it is possible to present operation instructions of the cross key 31 to the player more clearly, and this makes it possible to improve the taste relating to operations of the player. In this regard, it is possible to increase variations of the display of the operation guidance 110 relating to the input operation by pointing the operation instruction icon already specified by the player or pointing the operation instruction icon to be specified next using the cursor 113.

Moreover, in the embodiment described above, in the case where the cursor 113 reaches the operation instruction icon corresponding to the branching point, the control section 11 causes the display device 50 to temporarily display the plurality of cursors 113 so that the operation instruction icons respectively positioned at branch destinations of the branching point become selectable states by means of operational inputs from the player. Thus, it is possible to present operation instructions to the player more clearly, and this makes it possible to improve the taste relating to operations of the player.

Furthermore, in the embodiment described above, the control section 11 may calculate the level of operational skill of the player on the basis of the rate of operational inputs carried out by the player in accordance with the operation guidance 110 displayed in the upper image display screen 51 with respect to all of the operational inputs to the cross key 31 by the player. The control section 11 then causes the display device 50 to display the operation instruction icons 111a to 111i and/or the end display icons 112a to 112c so as to change the number of branching points in accordance with a calculation result thus calculated. Thus, it is possible to improve interest of the player in the video game while improving the taste relating to operations in accordance with the level of operational skill of the player.

Further, in the embodiment described above, the control section 11 may cause the display device 50 to display the special technique activation cards 122a to 122c so as to change the number of special technique activation cards in accordance with the calculation result of the level of operational skill of the player. Even in this case, it is also possible to improve interest of the player in the video game while improving the taste relating to operations in accordance with the level of operational skill of the player.

Moreover, in the embodiment described above, the control section 11 may cause the display device 50 to terminate the display of the operation guidance 110 in the case where it is determined that operational inputs to the cross key 31 by the player are not carried out within a predetermined period of time after the cursor 113 is moved so as to indicate one of the operation instruction icons. Thus, it is possible to improve the taste of the player relating to the operations, and it is possible to improve the interest of the player in the video game by stimulating player's will to continue to play the video game.

Furthermore, in the embodiment described above, the control section 11 causes the display device 50 to display the special technique activation icon 130 in the case where all of the display images of the special technique activation cards 122a to 122c displayed in the card display region 101b become exposed states in accordance with a predetermined condition. Thus, it is possible to improve interest of the player in the video game while improving taste relating to operations of the player by using various other elements such as thought of the player and a condition of luck in addition to operational skill of the player.

In this regard, in the embodiment described above, the privilege may be an icon to be utilized to activate a special attack for influencing a state or ability of an attack target character that the player character attacks, for example. Thus, it is possible to increase variations of attack by the player character, and this makes it possible to improve interest of the player in the video game.

Further, in the embodiment described above, the control section 11 may cause the display device 50 to terminate the display of the operation guidance 110 in the case where it is determined that the player character 42 suffers an attack from the enemy character 48a or 48b during the display of the operation guidance 110. Thus, it is possible to improve taste relating to operations, and it is possible to improve the interest of the player in the video game by stimulating player's will to continue to play the video game.

In this regard, in the embodiment described above, each of the operation instruction icons 111a to 111i may be an icon representing any one of the cross key 31 with which the keypad 30 is provided. Thus, it is possible to present an operation method to the player easily and clearly, and this makes it possible to improve the taste relating to operations of the player.

Moreover, in the embodiment described above, the video game apparatus 100 is constructed so that, for example, the player imagines the display images of the special technique activation cards 122a to 122c in the hidden states in predetermined order, availability of generation of a special technique activating right is determined when the display images of all of the special technique activation cards 122a to 122c become the exposed states. However, the present invention can of course utilize other method so long as the player carries out input operations in accordance with the operation guidance 110 in which one or more branching point of the operation instruction icons 111a to 111i is included, and precisely carries out input operation at the end of reached branching point, by which availability of a activation right for a special effect can be indicated using marks and/or images displayed on the end display icons 112a to 112c that are respectively displayed at the end positions of the one or more branching point.

As an example of the other method, for example, a style of so-called "blackjack", in which ones like cards are displayed on the end positions in place of the marks and the player imagines total points of numbers shown in the reached cards, may be mentioned. In this case, it is preferable that the images displayed at end positions via the branching point are displayed so as to be in hidden states. Further, similarly, a style of so-called "poker", in which cards are displayed at the end positions and the player gets a "winning combination" using the reached cards, may be mentioned. In this case, an effect of a special technique to become an activatable state and/or a rendition state thereof may be changed depending upon which "winning combination" the player gets.

Namely, the present invention is not particularly limited so long as the availability of the activation right of the special technique is determined by combining an element to require the accuracy of operations that the player operates the contents of the operation guidance 110 in which the branching point is included with an element to accomplish a mini game such as a card game and a puzzle game using marks, images, numerals and the like displayed at the positions reached by means of the operations. Various mini games and/or various display forms of the images displayed at the end positions in the operation guidance 110 can be utilized for the present invention.

Furthermore, although the video game apparatus main body 10 and the display device 50 are constructed from separate components in the embodiment described above, the display device 50 may be incorporated in the video game apparatus main body 10, as will be readily apparent to those skilled in the art, without departing from the scope of spirit of the present invention.

Further, although one example of the video game control for the RPG has been explained in the embodiment described above, there is no wonder that the technique of the present invention can be applied to similar video games such as a gun action RPG. In addition, the technique of the present invention can also be applied to other kinds of video games appropriately, as will be readily apparent to those skilled in the art, without departing from the scope of spirit of the present invention.

Moreover, although an aspect of the present invention has been described with the video game apparatus 100 as an example in the embodiment described above, the present invention is not limited thereto. The present invention can be applied to various apparatuses such as a personal computer, a cellular phone terminal, a portable game apparatus and the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the present invention.

Furthermore, in the embodiment described above, it has been described that game data for causing the video game apparatus main body 10 (video game apparatus 100) to execute the various processes described above (that is, various data such as control program data used for the video game) are stored in the storage medium 70. However, the present invention is not limited thereto. The video game data may be delivered by a server apparatus such as a network server (WWW server), or other computer device connected (either wired or wireless) to a network, such as the Internet, a local area network, a wide area network, or the like, or any combination thereof. In this case, the video game apparatus main body 10 may obtain the video game data delivered by the server apparatus via the communication network 80, and store the video game data in the HDD 13. The video game data may be used by being loaded on the RAM 12 from the HDD 13. In this regard, although the video game data are explained in the embodiment described above, such data may include at least control program data for causing a computer to execute the image generating process in the embodiment as described above.

The present invention can be applied to a video game machine, a personal computer, a cellular phone terminal, a portable game apparatus or the like, or any combination thereof that causes an image display apparatus to display a player character on an image display screen, and controls progress of a video game by controlling an action of the player character displayed on the image display screen in response to an operation by a player. Therefore, the present invention is useful.

What is claimed is:

1. A video game processing apparatus that causes an image display apparatus to display a player character on an image display screen of the image display apparatus, the video game processing apparatus controlling progress of a video game by controlling an action of the player character to be displayed on the image display screen in accordance with operations by a player, the video game processing apparatus comprising:

an action specification receiver that receives an action specification of the player character in response to an action specification operation by the player;

an operation guidance display controller that causes the image display apparatus to display operation guidance in a first specific region of the image display screen when the action specification receiver receives a specific action specification, the operation guidance including a plurality of operation instruction icons and a plurality of end display icons, the plurality of operation instruction icons being continuously arranged via at least one branching point in a state that the plurality of operation instruction icons can be selected in turn to cause the player to regularly and sequentially continue to perform operational inputs with an input section, the plurality of end display icons being predetermined images that indicate selected end positions to which the plurality of operation instruction icons lead;

a card-type icon display controller that causes the image display apparatus to display a plurality of card type icons, each having a display image, in a second specific region of the image display screen, the display images indicating the predetermined images of the plurality of end display icons, wherein, when it is determined that the player carries out the operational inputs regularly and sequentially so as to select the plurality of operation instruction icons in accordance with the operation guidance displayed on the image display screen by the operation guidance display controller and one of the plurality of end display icons is reached when the card type icon having the display image that indicates the predetermined image presented by the one end display icon is displayed in the second specific region, the card-type icon display controller causes the image display apparatus to display the display image of the card type icon so as to change from a hidden state to an exposed state at least temporarily; and a privilege applier that applies a privilege relating to a special effect to the player character when all of the display images of the plurality of card type icons displayed in the second specific region by the card-type icon display controller keep the exposed states for a predetermined period of time.

2. The video game processing apparatus according to claim 1, wherein the operation guidance display controller causes the image display apparatus to display a cursor that is included in the operation guidance, the cursor being displayed for movement along the plurality of operation instruction icons to indicate the operation instruction icon to be selected by the operational input of the player.

3. The video game processing apparatus according to claim 2, wherein, when the cursor reaches the operation instruction icon corresponding to one of the at least one branching points, the operation guidance display controller causes the image display apparatus to temporarily display a plurality of the cursors so that the operation instruction icons positioned at branch destinations of the one of the at least one branching points become selectable states by operational inputs of the player.

4. The video game processing apparatus according to claim 1, further comprising:
an operational skill calculator that calculates the level of operational skill of the player on the basis of the rate of operational inputs of the player in accordance with the operation guidance displayed by the operation guidance display controller with respect to the operational inputs to the input section by the player,
wherein the operation guidance display controller causes the image display apparatus to display the operation instruction icons and the end display icons so as to change the number of branching points in accordance with the level of operational skill calculated by the operational skill calculator.

5. The video game processing apparatus according to claim 4, wherein the card-type icon display controller causes the image display apparatus to display the card type icons so as to change the number of card type icons in accordance with the level of operational skill calculated by the operational skill calculator.

6. The video game processing apparatus according to claim 2, wherein the operation guidance display controller causes the image display apparatus to terminate the display of the operation guidance when it is determined that operational inputs to the input section by the player are not carried out within a predetermined period of time after the cursor is moved to indicate one of the operation instruction icons.

7. The video game processing apparatus according to claim 1, wherein the privilege applier applies the privilege to the player character when all of the display images of the card type icons displayed in the second specific region become exposed states in accordance with a predetermined condition.

8. The video game processing apparatus according to claim 1, wherein the privilege is an icon to be utilized to activate a special attack for influencing one of a state and an ability of an attack target character that the player character attacks.

9. The video game processing apparatus according to claim 8, wherein the operation guidance display controller causes the image display apparatus to terminate the display of the operation guidance when it is determined that the player character suffers an attack from the attack target character during the display of the operation guidance.

10. The video game processing apparatus according to claim 1, wherein each of the operation instruction icons is an icon representing one of a plurality of input keys with which the input section is provided.

11. A tangible computer-readable medium for storing an executable processing program for processing a video game, progress of the video game being controlled by causing an image display apparatus to display a player character of the video game on an image display screen of the image display apparatus, and controlling an action of the player character displayed on the image display screen in accordance with operations by a player, the tangible computer-readable medium comprising:
an executable receiving action specification code segment, that, when executed, causes the video game to receive an action specification of the player character in response to an action specification operation by the player;
an executable operation guidance displaying code segment, that, when executed, causes the video game to display, on the image display apparatus, operation guidance in a first specific region of the image display screen when a predetermined action specification is received for the player character, the operation guidance including a plurality of operation instruction icons and a plurality of end display icons, the plurality of operation instruction icons being continuously arranged via at least one branching point in a state that the plurality of operation instruction icons can be selected in turn to cause the player to regularly and sequentially continue to perform operational inputs with an input section, the plurality of end display icons being predetermined images that indicate selected end positions to which the plurality of operation instruction icons lead;
an executable card displaying code segment, that, when executed, causes the video game to display, on the image display apparatus, a plurality of card type icons, each having a display image, in a second specific region of the image display screen, the display images indicating the predetermined images of the plurality of end display icons, wherein, when it is determined that the player carries out the operational inputs regularly and sequentially so as to select the plurality of operation instruction icons in accordance with the operation guidance displayed on the image display screen and one of the plurality of end display icons is reached when the card type icon having the display image that indicates the predetermined image presented by the one end display icon is displayed in the second specific region, the card display code segment causes the video game to display, on the image display apparatus, the display image of the card type icon so as to change from a hidden state to an exposed state at least temporarily; and
an executable privilege applying code segment, that, when executed, causes the video game to apply a privilege relating to a special effect to the player character when all of the display images of the plurality of card type icons displayed in the second specific region keep the exposed states for a predetermined period of time.

* * * * *